(12) United States Patent
Filip et al.

(10) Patent No.: US 11,861,135 B1
(45) Date of Patent: Jan. 2, 2024

(54) AIRCRAFT SPATIAL CONFIGURATION DIFFERENCE DISPLAY SYSTEM

(71) Applicant: The Boeing Company, Chicago, IL (US)

(72) Inventors: Seth David Filip, Woodinville, WA (US); Neil Louis Hoopingarner, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 18/049,176

(22) Filed: Oct. 24, 2022

(51) Int. Cl.
*G06F 3/0481* (2022.01)
*G06Q 10/0875* (2023.01)
*G06F 3/04842* (2022.01)

(52) U.S. Cl.
CPC ........ *G06F 3/0481* (2013.01); *G06F 3/04842* (2013.01); *G06Q 10/0875* (2013.01)

(58) Field of Classification Search
None
See application file for complete search history.

(56) References Cited

U.S. PATENT DOCUMENTS

| | | | | |
|---|---|---|---|---|
| 10,300,928 B2 * | 5/2019 | Trageser | ............... | B60W 50/14 |
| 10,761,676 B1 * | 9/2020 | Gilbert | .................. | B64D 43/00 |
| 11,262,900 B1 * | 3/2022 | Burkhead | .............. | B64D 43/00 |
| 11,305,886 B1 * | 4/2022 | Gilbert | .................... | B64D 43/00 |
| 2012/0259549 A1 * | 10/2012 | McDonald | .............. | G01W 1/00 702/3 |
| 2018/0209837 A1 * | 7/2018 | Golshany | ............... | G06Q 10/04 |
| 2018/0300446 A1 * | 10/2018 | Troy | ........................ | G06F 30/15 |
| 2019/0179997 A1 * | 6/2019 | Colas | ...................... | G06F 30/15 |
| 2021/0374101 A1 * | 12/2021 | Briand | .................. | G06F 16/178 |
| 2022/0274691 A1 * | 9/2022 | Howell | ................. | B60T 13/686 |
| 2022/0284531 A1 * | 9/2022 | Gariel | .................... | G06Q 50/28 |
| 2023/0166568 A1 * | 6/2023 | Bill | ..................... | B60C 23/0496 340/12.23 |

* cited by examiner

*Primary Examiner* — Tuyetlien T Tran
(74) *Attorney, Agent, or Firm* — YEE & ASSOCIATES, P.C.

(57) ABSTRACT

A method, apparatus, system, and computer program product for visualizing aircraft configurations. A computer system determines a set of weight differences between weights for spatial zones in an aircraft and corresponding spatial zones in a comparison aircraft. The computer system displays a visual representation of the aircraft in a graphical user interface on a display system. The computer system displays the spatial zones in the visual representation of the aircraft in association with a set of graphical indicators identifying the set of weight differences between the spatial zones and the corresponding spatial zones in the graphical user interface on the display system. According to other illustrative embodiments, a computer system and a computer program product for visualizing aircraft configurations are provided.

26 Claims, 17 Drawing Sheets

AIRCRAFT SPATIAL CONFIGURATION DIFFERENCE DISPLAY SYSTEM

BACKGROUND INFORMATION

1. Field

The present disclosure relates generally to an improved computer system and in particular, to a method, apparatus, and a computer program product for displaying spatial configuration differences between aircraft.

2. Background

Configurations between two aircraft can be compared to determine if a model aircraft with the desired configuration is the same as another aircraft selected for comparison aircraft. The comparison of parts and locations of the parts between the two aircraft can be made by examining the bill of materials or models of the aircraft. The comparison can be made by a human operator to determine whether the comparison aircraft contains the same options as the model aircraft. As another example, a comparison of the passenger aircraft can be made with a cargo aircraft to determine changes that need to be made to convert the passenger aircraft into a cargo aircraft.

Comparing parts from bills of materials or models between two aircraft can be tedious and take large amounts of time especially for commercial passenger aircraft. With these types of aircraft, the comparison can involve hundreds of thousands or millions of parts. Further, errors can also occur in comparing these large numbers of parts.

Therefore, it would be desirable to have a method and an apparatus that take into account at least some of the issues discussed above, as well as other possible issues. For example, it would be desirable to have a method and an apparatus that overcome a technical problem with providing a visualization of configuration differences between aircraft.

SUMMARY

An embodiment of the present disclosure provides a method for visualizing aircraft configurations. A computer system determines a set of weight differences between weights for spatial zones in an aircraft and corresponding spatial zones in a comparison aircraft. The computer system displays a visual representation of the aircraft in a graphical user interface on a display system. The computer system displays the spatial zones in the visual representation of the aircraft in association with a set of graphical indicators identifying the set of weight differences between the spatial zones and the corresponding spatial zones in the graphical user interface on the display system. According to other illustrative embodiments, a computer system and a computer program product for visualizing aircraft configurations are provided.

Another embodiment of the present disclosure provides a method for visualizing platform configurations. A computer system determines a set of weight differences between weights for spatial zones in a platform and corresponding spatial zones in a comparison platform. The computer system displays a visual representation of the platform in a graphical user interface on a display system. The computer system displays the spatial zones in the visual representation of the aircraft in association with a set of graphical indicators identifying the set of weight differences between the spatial zones and the corresponding spatial zones in the graphical user interface on the display system. According to other illustrative embodiments, a computer system and a computer program product for visualizing platform configurations are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
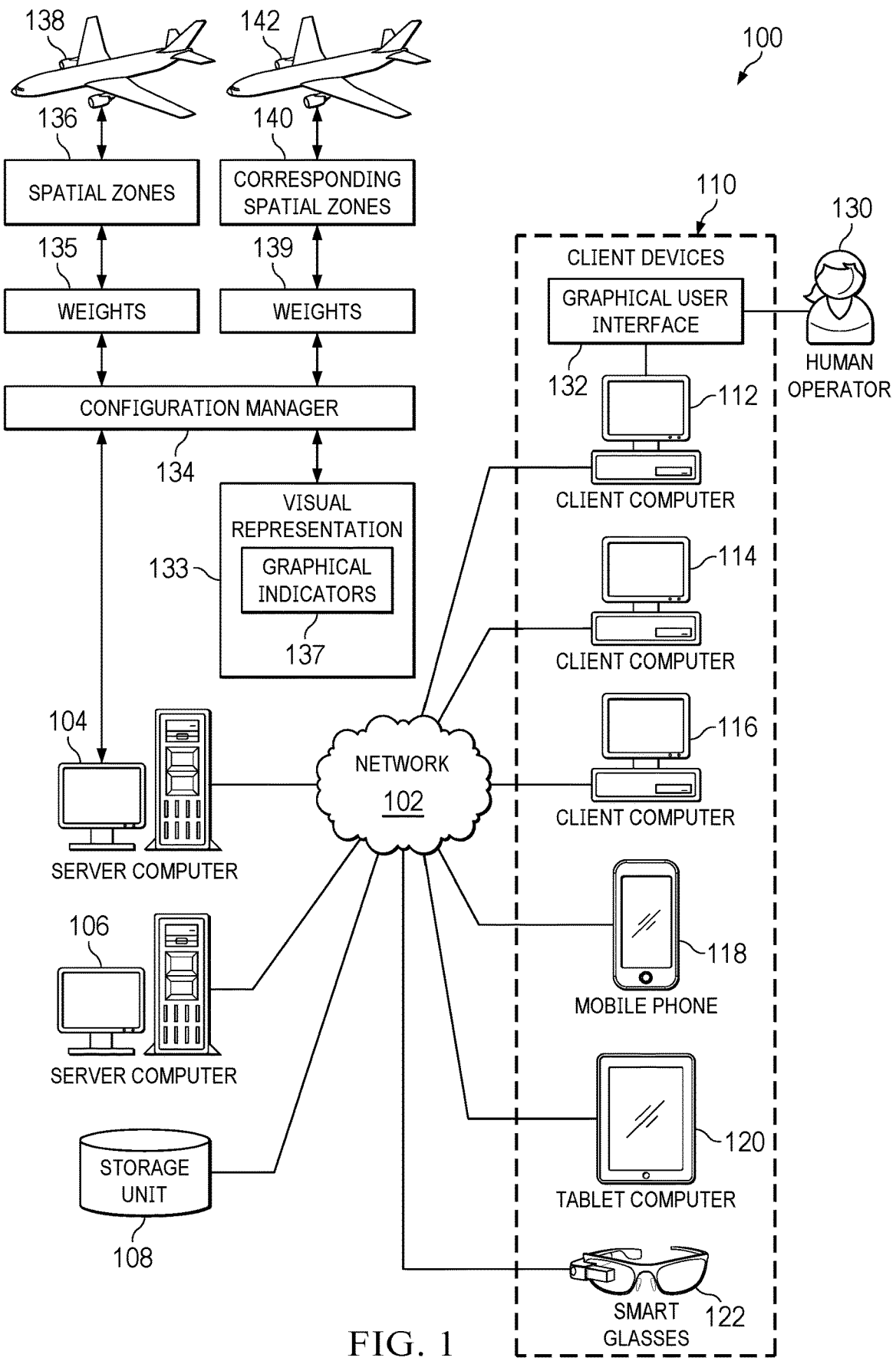
FIG. 1 is a pictorial representation of a network of data processing systems in which illustrative embodiments may be implemented.

The illustrative embodiments recognize and take into account one or more different considerations. For example, when modifying or reconfiguring an aircraft to match another aircraft, identifying discrepancies oor differences between the two aircraft can be important to determine whether a modification of a reconfiguration has been performed as desired. This comparison of configurations between the two aircraft can be a time-consuming and tedious process.

For example, the configurations of two aircraft can be compared by an analysis of the bills of materials (BOMs) for parts used to manufacture the two aircraft. Further, spatial positions for these parts are also needed to determine whether the parts are installed in the same positions in both aircraft. Additionally, the bills of materials are also analyzed to determine whether a particular part meets the same specifications. For example, the bills of materials for the two aircraft can be examined to determine whether the same types of fasteners are used in both aircraft. This analysis is time-consuming and tedious. As result, it may be difficult to determine whether the specified change in configuration has been properly implemented.

As another example, when examining configuration differences between two airplane lines, the configuration differences can be determined by examining the part structures. With this type of comparison, thousands of differences can be present between the airplanes being manufactured on the two airplane lines. These numerous differences in part structures can be difficult for a human operator to visualize or comprehend by viewing part structures.

The illustrative embodiments recognize and take into account that another solution can involve determining the weight of the aircraft in different spatial zones based on the weight of the parts in those spatial zones. These weight differences are displayed in a visual representation of the aircraft on a graphical user interface on a display system to a human operator.

In this manner, the human operator can compare two or more aircraft configurations by viewing the visual representation of the weight differences. This visualization of the weight differences can enable a human operator to more easily visualize and understand differences between airplane configurations. For example, the human operator can visualize where differences are present between configurations of aircraft based on the visualization of weight differences between spatial zones.

Thus, the illustrative embodiments provide a method, apparatus, computer system, and computer program product for visualizing aircraft configurations. These visualizations of aircraft configurations can be based on weight differences between weights in different spatial zones for the aircraft being compared.

In one illustrative example, a computer system determines a set of weight differences between weights for spatial zones in an aircraft and corresponding spatial zones in a comparison aircraft. The computer system displays a visual representation of the aircraft in a graphical user interface on a display system. The computer system displays the spatial zones in the visual representation of the aircraft in association with a set of graphical indicators identifying the set of weight differences between the spatial zones and the corresponding spatial zones in the graphical user interface on the display system.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, human operator 130 at client computer 112 can compare configurations for different aircraft to determine configuration differences. These differences can be displayed on graphical user interface 132 in client computer 112 to human operator 130. For example, human operator 130 can select aircraft 138 and comparison aircraft 142 for comparison.

As depicted, this comparison of aircraft configurations can be made using configuration manager 134 running on server computer 104. In one illustrative example, configuration manager 134 can compare weights 135 for spatial zones 136 for aircraft 138 with weights 139 in corresponding spatial zones 140 in comparison aircraft 142.

With the weight comparison, configuration manager 134 creates visual representation 133 of spatial zones 136 in aircraft 138 that includes graphical indicators 137 identifying whether weight differences are present between spatial zones 136 and corresponding spatial zones 140. In this example, graphical indicators 137 can also indicate an amount of weight difference between spatial zones 136 and corresponding spatial zones 140.

This visualization of weight differences between spatial zones 136 for aircraft 138 and corresponding spatial zones 140 for comparison aircraft 142 enables human operator 130 to understand and evaluate differences between configurations of aircraft 138 and comparison aircraft 142 as compared to current comparison techniques more easily.

In addition to these visualizations of weight differences in spatial zones, human operator 130 can obtain more information about a spatial zone that has a weight difference between aircraft 138 and comparison aircraft 142. For example, configuration manager 134 can display to human operator 130 a visualization of parts with weight differences, a bill of materials identifying part differences, a table of parts with weight differences, or other types of visualizations. As a result, human operator 130 can more quickly determine where differences are present between particular parts such as fasteners, modules, or other parts.

Additionally, human operator 130 can focus on particular spatial zones in aircraft 138. For example, if a reconfiguration of aircraft 138 has been performed to update a galley to match the galley in comparison aircraft 142, human operator 130 can identify the spatial zone in aircraft 138 where the galley reconfiguration was performed. The visualization can enable human operator 130 to quickly determine whether configuration differences are present in the spatial zone containing the galley.

Figure 2:
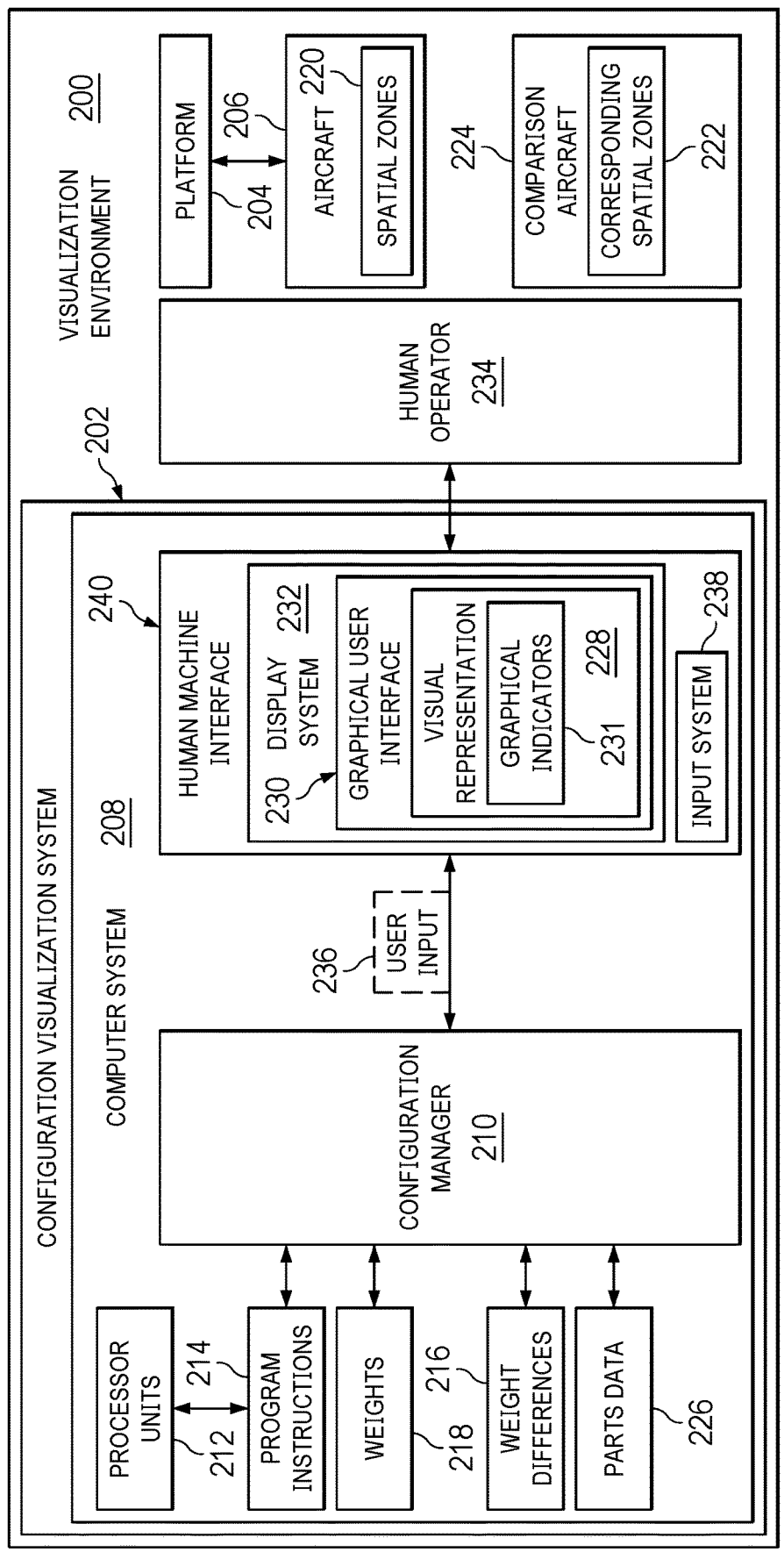
FIG. 2 is a block diagram of a visualization environment in accordance with an illustrative embodiment.

With reference now to FIG. 2, a block diagram of a visualization environment is depicted in accordance with an illustrative embodiment. In this illustrative example, visualization environment 200 includes components that can be implemented in hardware such as the hardware shown in network data processing system 100 in FIG. 1.

As depicted, configuration visualization system 202 in visualization environment 200 can operate to provide a visualization of platform configurations for platform 204 such as aircraft 206. Aircraft 206 can take a number of different forms. For example, aircraft 206 can be selected from one of a commercial airplane, a cargo aircraft, a refueling airplane, a tilt-rotor aircraft, a tilt wing aircraft, a vertical takeoff and landing aircraft, an electrical vertical takeoff and landing vehicle, a personal air vehicle, and other types of aircraft.

In this illustrative example, configuration visualization system 202 comprises computer system 208 and configuration manager 210. As depicted, configuration manager 210 is located in computer system 208. Configuration manager 134 in FIG. 1 is an example of configuration manager 210.

Configuration manager 210 can be implemented in software, hardware, firmware or a combination thereof. When software is used, the operations performed by configuration manager 210 can be implemented in program instructions configured to run on hardware, such as a processor unit. When firmware is used, the operations performed by configuration manager 210 can be implemented in program instructions and data and stored in persistent memory to run on a processor unit. When hardware is employed, the hardware may include circuits that operate to perform the operations in configuration manager 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium may be a network. The data processing systems may be selected from at least one of a computer, a server computer, a tablet, or some other suitable data processing system.

As depicted, computer system 208 includes a number of processor units 212 that are capable of executing program instructions 214 implementing processes in the illustrative examples. In other words, program instructions 214 are computer readable program instructions.

As used herein a processor unit in the number of processor units 212 is a hardware device and is comprised of hardware circuits such as those on an integrated circuit that respond and process instructions and program code that operate a computer. When the number of processor units 212 execute program instructions 214 for a process, the number of processor units 212 can be one or more processor units that are on the same computer or on different computers. In other words, the process can be distributed between processor units on the same or different computers in a computer system 208. Further, the number of processor units 212 can be of the same type or different type of processor units. For example, a number of processor units 212 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, configuration manager 210 determines weights 218 for spatial zones 220 in aircraft 206 and corresponding spatial zones 222 in comparison aircraft 224. Weights 218 can be selected from one of actual part weights and estimated part weights. The comparisons can be made when the same type of weights is used in the different illustrative examples.

Actual part weights can be weights in a specification for actual parts such as a bill of materials. The estimated part weights can be weights from a model of the aircraft that are selected for design or estimation purposes.

Spatial zones 220 can be selected in a number of different ways. For example, spatial zones 220 can be selected based on at least one of structure, user selection, or other parameters. Additionally, spatial zones 220 can be a portion of aircraft 206. In other words, spatial zones 220 do not have to make up the entire volume of aircraft 206. When spatial zones 220 are based on structure, the structure can be, for example, a fuselage, a wing, an engine, a horizontal stabilizer, a tail section, a cockpit, or some other suitable structure.

In this illustrative example, the determination of weights 218 can be performed in a number of different ways. For example, configuration manager 210 can determine weights 218 for spatial zones 220 and corresponding spatial zones 222 using parts data 226. Parts data 226 can be comprised of at least one of a bill of materials identifying parts used in the aircraft and the comparison aircraft, spatial part information identifying part locations for the parts, weight data for the parts, a parts list, a part location table, a weight list for the parts, or other types of parts data 226.

From the determination of weights 218, configuration manager 210 determines a set of weight differences 216 between weights 218 for spatial zones 220 in an aircraft and corresponding spatial zones 222 in comparison aircraft 224.

Configuration manager 210 creates visual representation 228 of aircraft 206. Configuration manager 210 associates a set of graphical indicators 231 with one or more of spatial zones 220 in visual representation 228. In this illustrative example, the set of graphical indicators 231 identify the set of weight differences 216 between spatial zones 220 and corresponding spatial zones 222.

The set of graphical indicators 231 can take a number of different forms. For example, the set of graphical indicators can be selected from at least one of an icon, a pictogram, an ideogram, a graphic, an image, text, animation, bolding, a color, a line, an arrow, or other suitable graphic. A graphical indicator can be associated with a spatial zone by drawing attention to the spatial zone.

In this illustrative example, configuration manager 210 displays visual representation 228 of aircraft 206 in graphical user interface 230 on display system 232. Configuration manager 210 also displays spatial zones 220 in visual representation 228 of aircraft 206 in association with the set of graphical indicators 231 identifying the set of weight differences 216 between spatial zones 220 and corresponding spatial zones 222 in graphical user interface 230 on display system 232.

As depicted, display system 232 is a physical hardware system and includes one or more display devices on which graphical user interface 230 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Human operator 234 is a person that can interact with graphical user interface 230 through user input 236 generated by input system 238 for computer system 208. Input system 238 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device. Display system 232 and input system 238 form human machine interface (HMI) 240.

In this illustrative example, human operator 234 can interact with visual representation 228 of aircraft 206 displayed in graphical user interface 230 on display system 232 in human machine interface 240. This interaction can be formed through user input 236.

Figure 3:
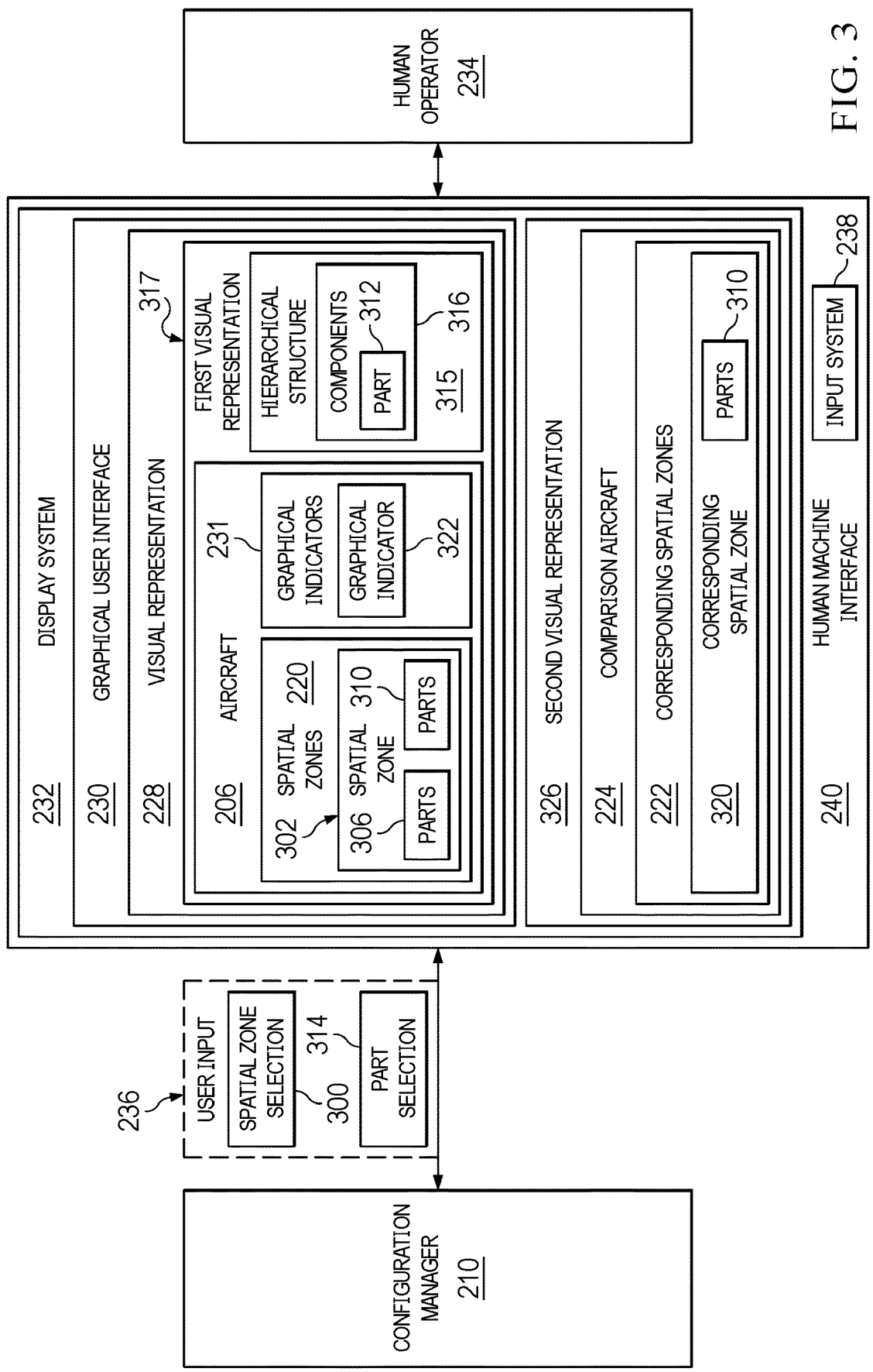
FIG. 3 is an illustration of a block diagram of user interactions with a visual representation of aircraft in accordance with an illustrative embodiment.

Turning next to FIG. 3, an illustration of a block diagram of user interactions with a visual representation of aircraft is depicted in accordance with an illustrative embodiment. In the illustrative examples, the same reference numeral may be used in more than one figure. This reuse of a reference numeral in different figures represents the same element in the different figures.

In this illustrative example, aircraft 206 and spatial zones 220 are displayed in visual representation 228. In this example, graphical indicators 231 are displayed in association with spatial zones 220 to indicate weight differences that may be present between aircraft 206 and comparison aircraft 224.

Graphical indicators 231 can indicate different types of information regarding the weight comparison between aircraft 206 and comparison aircraft 224. For example, graphical indicators 231 can indicate at least one of a presence of a weight difference, an absence of a weight difference, an amount of a weight difference, a part category, or other suitable information.

This type of information can be conveyed by graphical indicators 231 in first visual representation 317 displayed on graphical user interface 230 using graphical indicators such as, for example, text, bolding, color, icons, animation, legends, pictograms, tables, or other suitable types of graphical indicators.

For example, a graphical indicator such as color can be used in a spatial zone to indicate the presence or absence of a weight difference between the spatial zone and a corresponding spatial zone. Another graphical indicator can be used to indicate the amount of weight difference.

This amount of weight difference can be, for example without limitation, based on ranges of weight differences of actual weights. For example, the ranges of weight differences can be identified using text or icons indicating a particular range for the weight difference. In another example, numbers can be used to represent the actual weight differences identified. These numbers can be displayed in a manner that draws attention to the spatial zone in which the weight difference is present.

In this depicted example, human operator 234 can interact with visual representation 228 to obtain additional information about weight differences in spatial zones 220 displayed in visual representation 228. For example, human operator 234 can generate spatial zone selection 300 in user input 236. Spatial zone selection 300 is a selection of spatial zone 302 in spatial zones 220 in aircraft 206 as displayed in visual representation 228.

In response to receiving spatial zone selection 300 in user input 236, configuration manager 210 can identify group of parts 306 in spatial zone 302 and in the corresponding spatial zone having the weight difference in response to spatial zone selection 300 of spatial zone 302. Configuration manager 210 can display the group of parts 306 in association with spatial zone 302 in graphical user interface 230. In this illustrative example, parts 306 can be, for example, one of a module, an assembly, components, or some other type of part.

The display of the group of parts in association with spatial zone 302 can be within spatial zone 302 or in a location in visual representation 228 that indicates that the group of parts 306 are within spatial zone 302.

In this manner, human operator 234 can visualize the group of parts 306 within spatial zone 302. As a result, human operator 234 can more easily identify and evaluate differences in configuration between aircraft 206 and comparison aircraft 224 through the visualization of these differences within visual representation 228.

In this illustrative example, the display of the group of parts 306 can take a number of different forms. For example, the group of parts 306 can be displayed as graphical three-dimensional objects, a parts list, a bill of materials containing the group of parts, table of parts, or in some other suitable manner.

Additionally, human operator 234 can select part 312 from the display of parts 306 for spatial zone 302 in visual representation 228 displayed in graphical user interface 230. This selection of part 312 by human operator 234 can result in part selection 314 in user input 236.

In response to receiving part selection 314, configuration manager 210 can determine hierarchical structure 315 of components 316 containing part 312. In this illustrative example, components 316 are parts that can be assembled to form hierarchical structure 315. In this example, components 316 in one level in hierarchical structure 315 can be assembled or connected to form another component at higher level in hierarchical structure 315.

Configuration manager 210 can display hierarchical structure 315 of components 316 with graphical indicator 322 identifying part 312 in components 316 in hierarchical structure 315 having the weight difference. In this example, components 316 are a grouping of parts having hierarchical structure 315. For example, components 316 can be parts for a structure such as a fan, a power module, an engine housing, a landing gear system, an antenna array, or some other structure.

As depicted, graphical indicator 322 can identify part 312 that has the weight difference in components 316 and hierarchical structure 315. As result, human operator 234 can more easily identify one or more components in a hierarchal structure of components that has the weight difference.

In another illustrative example, configuration manager 210 identifies a group of parts 310 in spatial zone 302 that is absent from corresponding spatial zone 320 in comparison aircraft 224. In this example, configuration manager 210 can display the group of parts 310 in spatial zone 302 with graphical indicator 322 that indicates the group of parts is absent from corresponding spatial zone 320 in comparison aircraft 224.

In another illustrative example, configuration manager 210 can display additional visualizations in response to a group of parts 310 being missing from spatial zone 302. For example, visual representation 228 of aircraft 206 is first visual representation 317. With this example, configuration manager 210 can display second visual representation 326 in graphical user interface 230. As depicted, second visual representation 326 includes comparison aircraft 224 with corresponding spatial zones 222.

In this illustrative example, configuration manager 210 displays the group of parts 310 in a number of corresponding spatial zones 222 in second visual representation 326 of comparison aircraft 224 in graphical user interface 230 on display system 232. With second visual representation 326 of aircraft 206, human operator 234 can more easily visualize the differences in configurations between aircraft 206 and comparison aircraft 224.

This type of visualization enables human operator 234 to see parts that are present in both aircraft but in different locations. Thus, human operator 234 can see corresponding parts ended up in comparison aircraft 224.

As result, human operator 324 can more easily perceive and understand where differences are present between aircraft 206 and comparison aircraft 224 based on weight differences displayed in the different spatial zones for these aircraft. Further, when a spatial zone of interest is identified, additional formation can be displayed such as details about parts with weight differences between the two aircraft. The additional information can also include an identification of the location of these parts in the two aircraft.

In one illustrative example, one or more technical solutions are present that overcome a technical problem with comparing and visualizing configurations of aircraft. As a result, one or more technical solutions may provide a technical effect providing visualizations of aircraft configurations based on weights of parts. **

In one or more illustrative examples, weights for parts are identified for spatial zones in an aircraft and a comparison aircraft. The comparison aircraft can be an aircraft having a desired configuration for comparison.

In this example, the weight differences between spatial zones can be displayed in a visual representation that enables a user to more quickly and easily comprehend and understand whether differences are present in configurations based on the identification of weight differences. Further, one or more illustrative examples also enable a user to select a spatial zone with weight differences and identify one or more parts that may have a weight difference between the aircraft and the comparison aircraft.

In another illustrative example, visual representation can also identify when parts in the aircraft are absent from the comparison aircraft. Other visualizations can include determining particular components a hierarchy of components in a structure or assembly.

In the illustrative example, computer system 208 can be configured to perform at least one of the steps, operations, or actions described in the different illustrative examples using software, hardware, firmware or a combination thereof. As a result, computer system 208 operates as a special purpose computer system in which configuration manager 210 in computer system 208 enables a human operator to see weight differences in spatial zones between an aircraft and a comparison aircraft. In particular, configuration manager 210 transforms computer system 208 into a special purpose computer system as compared to currently available general computer systems that do not have configuration manager 210.

In the illustrative example, the use of configuration manager 210 in computer system 208 integrates processes into a practical application for visualizing aircraft configurations. In other words, configuration manager 210 in computer system 208 is directed to a practical application of processes integrated into configuration manager 210 in computer system 208 that determine weight differences between weights in spatial zones in an aircraft and a comparison aircraft and displays a visual representation of the aircraft in a graphical user interface. Graphical indicators are associated with the spatial zones in the visual representation to indicate whether weight differences are present.

In one or more illustrative examples, graphical user interface 230 solves problems present with current graphical user interface devices (GUIs) in the context of data validation, relating to speed, accuracy, and usability. Rather than reciting a mathematical algorithm, a fundamental economic or longstanding commercial practice, or a challenge in business, graphical user interface 230 improves on existing graphical user interface devices that do not utilize configuration manager 134 in FIG. 1 or configuration manager 210 in FIG. 2.

The illustrative examples of graphical user interface 230 provide significantly more than prior graphical user interface devices that merely allow for setting, displaying, and selecting data or information that is visible on a graphical user interface device. Instead, graphical user interface 230 utilizes a specific, structured interface directly related to a prescribed functionality that resolves a specifically identified problem of automatic data retrieval and comparison. For example, in the illustrative examples, visualization of configuration differences between aircraft can be more easily perceived by a user through displaying graphical indicators that indicate weight differences in different spatial zones in an aircraft and a comparison aircraft.

Graphical user interface 230 is improved from prior interfaces that merely allow a user to review the bill of materials or parts lists between an aircraft and a comparison aircraft. Further, this graphical user interface is improved over other graphical user interfaces that display computer aided design (CAD) models between an aircraft and a comparison aircraft.

Furthermore, the specific structure and concordant functionality of graphical user interface 230 distinguishes this system as compared to conventional computer implementations of known procedures. The function of graphical user interface 230 is not simply the generalized use of computer system 208 as a tool to conduct a known or obvious process. Instead, graphical user interface 230 provides an inventive concept that allows for determining weights of spatial zones for identifying differences in aircraft configurations and displaying those weight differences as a visual representation of spatial zones with graphical indicators that identify the weight differences between the aircraft and the comparison aircraft.

The illustration of visualization environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, graphical user interface 230 displays first visual representation 317 of aircraft 206 and second visual representation 326 of comparison aircraft 224. In other illustrative examples, a single visual representation can contain both aircraft. As another example, one or more aircraft in addition to comparison aircraft 224 can be compared to aircraft 206 using configuration manager 210. In this example, graphical indicators 231 in visual representation 228 can be used to indicate which aircraft weight differences are present in comparing those aircraft to aircraft 206.

In another example, aircraft 206 and comparison aircraft 224 can be designs of aircraft and the comparison weights can be between spatial zones in the designs of the two aircraft. For example, a comparison can be made between the current design and a new design that is being developed.

In yet another illustrative example, aircraft 206 and comparison aircraft 224 can be the same aircraft at different points in time or different locations in an assembly line. For example, aircraft 206 can be the configuration of aircraft 206 at an earlier point in time in an assembly line as compared to the configuration of the same aircraft, which is comparison aircraft 224, at a later time farther down the assembly line. In this manner, weight differences can be determined to enable a human operator to evaluate whether parts have been installed as desired during different phases of aircraft manufacturing.

Figure 4:
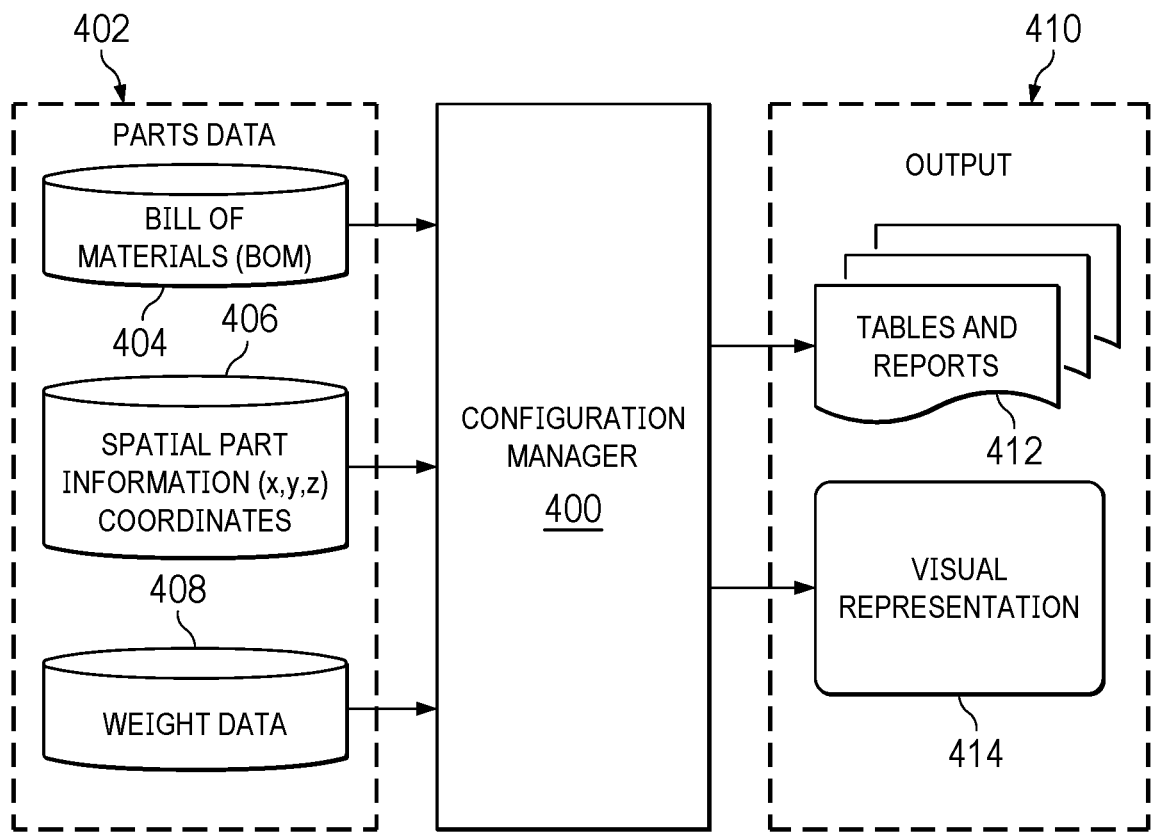
FIG. 4 is an illustration of a block diagram of generating output identifying weight differences between an aircraft and a comparison aircraft in accordance with an illustrative embodiment.

With reference next to FIG. 4, an illustration of a block diagram of generating output identifying weight differences between an aircraft and a comparison aircraft is depicted in accordance with an illustrative embodiment. In this illustrative example, configuration manager 400 is an example of an implementation for configuration manager 210 in FIG. 2.

As depicted, configuration manager 400 can determine the weight for each spatial zone in an aircraft for a particular aircraft configuration using parts data 402. In this illustrative example, parts data 402 is an example of parts data 226 in FIG. 2.

As depicted, parts data 402 comprises a number of different types of data regarding the parts in aircraft. As depicted, parts data 402 comprises bill of materials (BOM) 404, spatial part information 406, weight data 408.

Bill of materials 404 is a list of the materials, parts, and the quantities of parts needed to manufacture an aircraft or parts for an aircraft. These parts can be, for example, assemblies, subassemblies, intermediate assemblies, intermediate structures, or other objects. Bill of materials 404 includes part identifiers that are associated with the parts in this example. Spatial part information 406 identifies locations for parts. The locations can be described using a three dimensional coordinate system such as (x, y, z) coordinates in a Cartesian coordinate system. In the illustrative example, the parts in spatial part information 406 are correlated to parts in bill of materials 404 by using part identifiers. Weight data 408 is the weight of the parts. In some illustrative examples, weight data 408 may be located in bill of materials 404.

As depicted, configuration manager 400 can determine weight from parts data 402 for each spatial zone in an aircraft and a comparison aircraft. With the determination of weight in spatial zones for the two aircraft, the difference between the weight of the two aircraft in the different spatial zones can be determined.

Configuration manager 400 uses these weight differences to generate output 410. In this example, output 410 comprises tables and reports 412 and visual representation 414.

Tables and reports 412 are tables and documents that contain weight difference information. Tables and reports 412 can identify spatial zones in the aircraft and provide numbers for the weight differences between spatial zones. Additionally, these tables and reports can also identify weight differences between corresponding components found in both the spatial zone for the aircraft and the corresponding spatial zone for the comparison aircraft. As another example, these tables and reports can also include information about parts in a spatial zone in the aircraft that are not found in a corresponding spatial zone in the comparison aircraft.

As depicted, visual representation 414 in output 410 can be displayed in a graphical user interface for viewing by a human operator. In this example, visual representation 414 is a graphical depiction of the aircraft and spatial zones in the aircraft. This visual representation also identifies any weight differences that are present in the spatial zones. In some cases, the weight differences may be no differences in weight.

Figure 5:
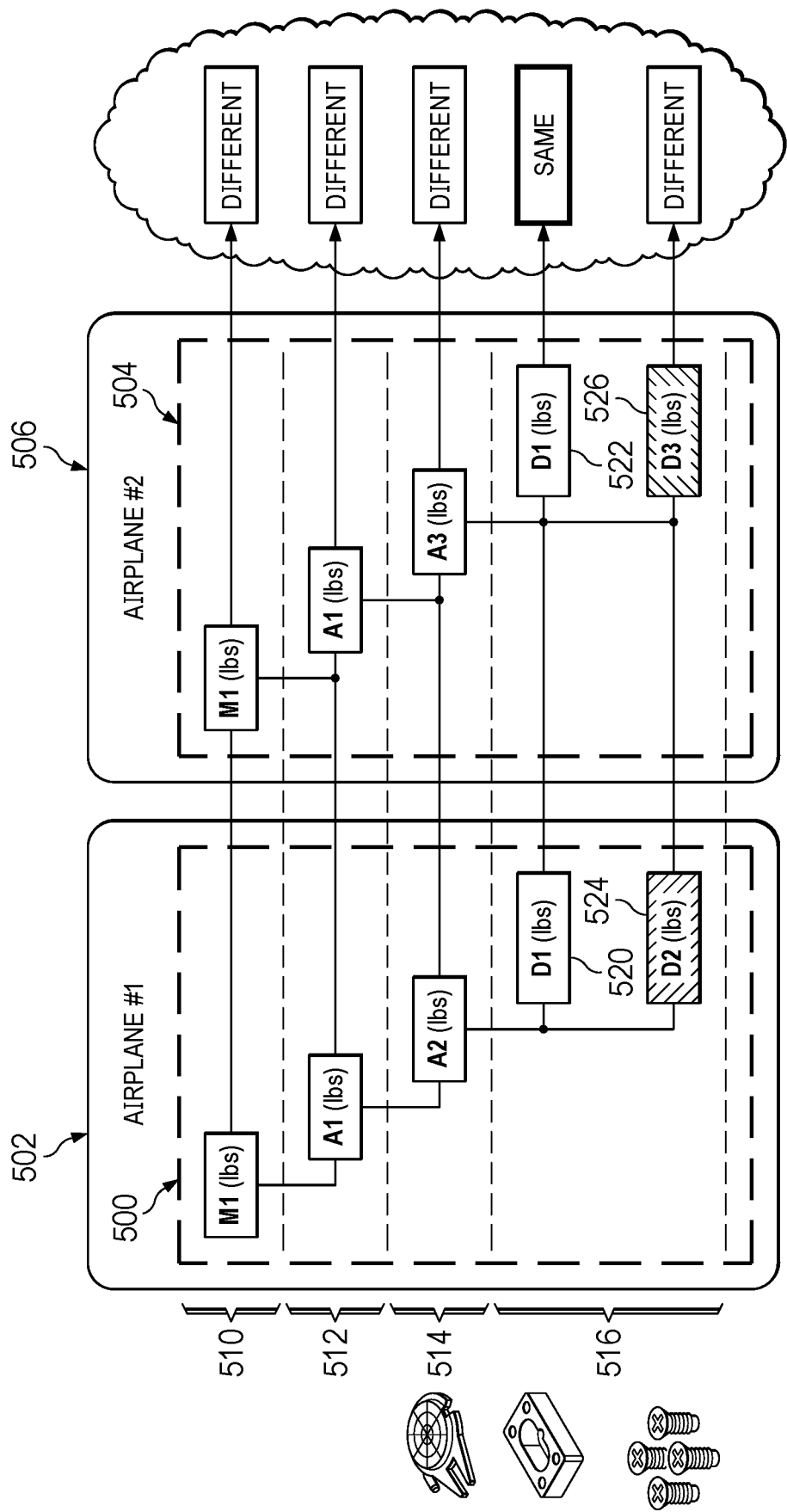
FIG. 5 is an illustration of a diagram of a weight difference for parts in a hierarchical structure in accordance with an illustrative embodiment.

With reference next to FIG. 5, an illustration of a diagram of a weight difference for parts in a hierarchical structure is depicted in accordance with an illustrative embodiment. In this illustrative example, a comparison is made between hierarchical structure 500 in airplane #1 502 and hierarchical structure 504 in airplane #2 506. In this example, hierarchical structure 500 is a part in airplane #1 502 and hierarchical structure 504 is the corresponding part in airplane #2 506. As part of the comparison, these two parts are compared to determine whether the weight difference is present.

In making this determination, the components forming hierarchical structure 500 and hierarchical structure 504 are compared to determine whether any components forming hierarchical structure 500 and hierarchical structure 504 have weight differences. As depicted, a difference is present at level 0 510, at level 1 512, and level 3 514 between the components in hierarchical structure 500 and hierarchical structure 504.

At level 4 516, two components are present in hierarchical structure 500 and hierarchical structure 504. As depicted, component D1 520 in hierarchical structure 500 and corresponding component D1 522 in hierarchical structure 504 have the same weight. At level 4 516, component D2 524 in hierarchical structure 500 and corresponding component D3 526 in hierarchical structure 504 do not have the same weight. A weight difference is present between these two parts. For example, if component D2 524 and corresponding component D3 526 are fasteners, then these fasteners may be comprised of different alloys resulting in a weight difference. In another illustrative example, different dimensions for these fasteners can also result in a weight difference. The weight difference of these two parts causes a weight difference to be present in the upper hierarchical levels of these two article structures. For example, the weight difference of component D2 524 and corresponding component D3 526 causes a weight difference to be present at level 3 514.

In the different illustrative examples, this identification of the weight difference between one or more components in hierarchical structures can presented to the user in a visual representation. This additional detail can be displayed in response to a user input requesting the additional detail.

Figure 6:
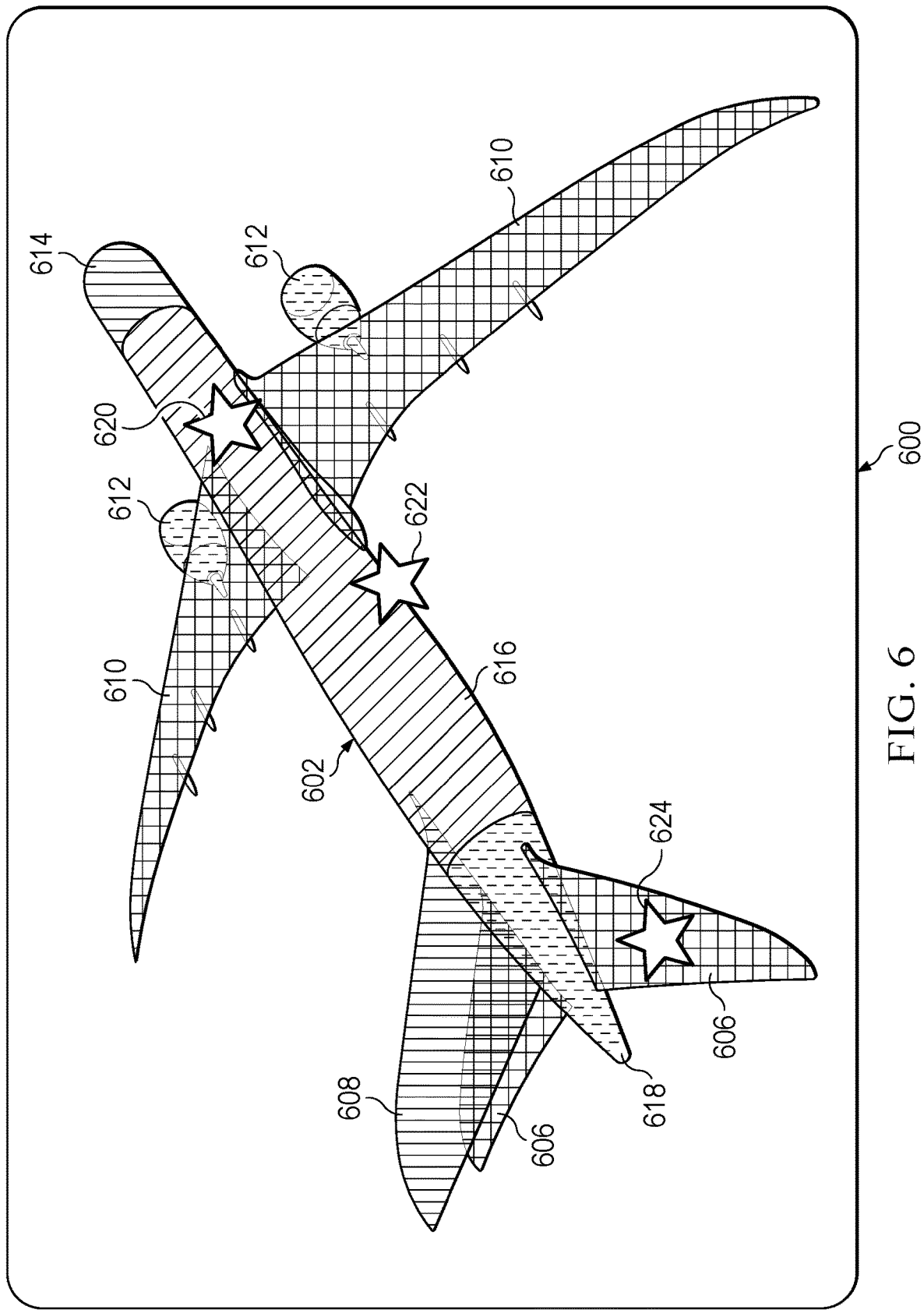
FIG. 6 is an illustration of a visual representation of weight differences in spatial zones in an aircraft in accordance with an illustrative embodiment.

With reference next to FIG. 6, an illustration of a visual representation of weight differences in spatial zones in an aircraft is depicted in accordance with an illustrative embodiment. In this illustrative example, visual representation 600 is an example of one implementation for visual representation 228 in FIG. 2 and FIG. 3.

As depicted, airplane 602 is displayed in visual representation 600 with spatial zones in airplane 602. In this example, the spatial zones in airplane 602 include horizontal stabilizers 606, vertical stabilizer 608, wings 610, engines 612, nose section 614, body 616, and tail section 618.

In this illustrative example, graphical indicators are displayed in association with some spatial zones in airplane 602. As depicted, the graphical indicators include graphical indicator 620, graphical indicator 622, and graphical indicator 624. In this example, graphical indicator 620 and graphical indicator 622 indicate that weight differences are present in body 616. As shown, graphical indicator 624 indicates that a weight difference is present in horizontal stabilizers 606.

In this illustrative example, these graphical indicators are positioned with respect to spatial zones to indicate a location in the spatial zones where the weight differences are found. In this example, two locations are present in body 616 in which weight differences are present.

These graphical indicators can be selected to present more information. For example, the selection of graphical indicator 624 can result in a display of the parts in which weight differences are present in horizontal stabilizers 606. This presentation of the weight differences can be in a table, a three-dimensional view of the parts, or in other forms. In another illustrative example, the table can include information about the values for the weight differences, part identifiers, and other information.

Figure 7:
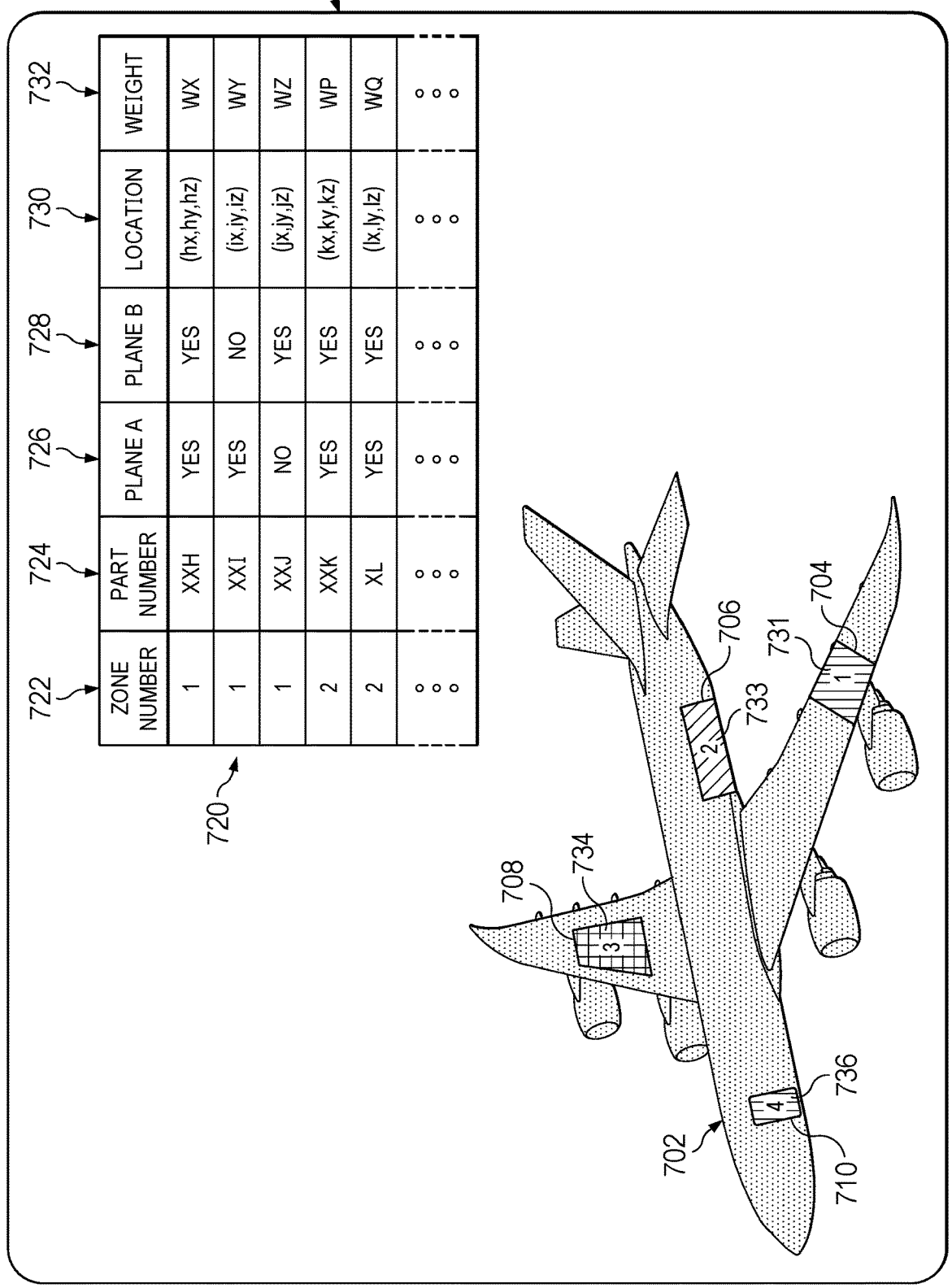
FIG. 7 is an illustration of a visual representation of weight differences in spatial zones in an aircraft in accordance with an illustrative embodiment.

With reference next to FIG. 7, an illustration of a visual representation of weight differences in spatial zones in an aircraft is depicted in accordance with an illustrative embodiment. In this illustrative example, visual representation 700 is another example of an implementation for visual representation 228 in FIG. 2 and FIG. 3.

As depicted, visual representation 700 provides a visualization of airplane 702 with four spatial zones. The spatial zones are zone 1 704, zone 2 706, zone 3 708, and zone 4 710. In this illustrative example, these four spatial zones are only a portion of the airplane 702. In other words, the spatial zones do not have to make up the entire volume within an aircraft.

In this illustrative example, visual representation 700 also includes table 720. Table 720 identifies information about parts in an aircraft and a comparison aircraft. Table 720 comprises columns comprising zone number 722, part number 724, Plane A 726, Plane B 728, location 730, and weight 732.

Zone number 722 identifies the spatial zone for the aircraft and the comparison aircraft. Part number 724 identifies a part number for a part. Plane A 728 is the aircraft and indicates whether the part is present in the aircraft. Plane B 728 is the comparison aircraft and indicates whether the part is present in the comparison aircraft. Location 730 identifies the location in three-dimensional space of the part identified by the part number within the zone. Weight 732 identifies the weight of the part identified by part number.

In this illustrative example, zone 1 704 contains part XXH and part XXI in Plane A, and contains part XXH and part XXJ in Plane B. In this example, part XXI is not present in Plane B and part XXJ is not present in Plane A. The sum of the weights for the part in Plane A is WX+WY and the sum of the weights for the part in Plane B is WY+WZ. In this example, the weight difference or zone 1 704 is WY-WZ. As a result, zone 1 704 is associated with graphical indicator 731, which is a first color, such as red.

Also in this example, zone 2 706 contains part XXK and part XL. Both of these parts are present in both Plane A and Plane B. These parts both have the same weight as a result, a weight difference for zone 2 706 is zero. In other words, the weight difference is no difference in weight between the parts in zone 2 706 in Plane A and Plane B. In this example, zone 2 706 is associated with graph indicator 733, which is a second color such as green.

In this illustrative example, zone 3 708 as graph indicator 734. In this example, graph indicator 734 is third color such as yellow. Zone 3 708 in both Plane A and Plane B may have no weight difference. However, in this case, one of the parts in Plane A may be in a different location in zone 3 708 from the corresponding part in Plane B. In this example, zone 4 710 is associated with graphical indicator 736, which is the same color as graphical indicator 731.

The graphical representations illustrated in FIG. 6 and FIG. 7 are provided as example implementations for visual representation 228 displayed in graphical user interface 230 on display system 232 in FIG. 2 and FIG. 3. These example illustrations are not meant to limit the manner in which other visual representations can be presented. For example, in another illustrative example, visual representation 700 can omit table 720. In other illustrative examples, table 720 can take other forms. For example, table 720 can use a single column in place of Plane A 726, Plane B 728 to indicate if a part is in a particular airplane. For example, the column can indicate whether a part is in "both" airplanes, in "A only, or in "B only". In yet another example, table 720 can include another column for Plane C such that a comparison of more than two airplanes can be made.

In yet another illustrative example, visual representation can display a hierarchy of parts when hierarchical structures are present in an aircraft. This display can identify parts within the aircraft structure that have a weight difference between the two aircraft. In yet another illustrative example, graphical indicators can also include numbers identifying the weight difference between a part in an aircraft and the corresponding part in the comparison aircraft.

Additionally, these graphical representations can be three-dimensional graphical representations that can be manipulated by a human operator. For example, a human operator can change rotate or turn the airplane in the graphical representation.

In yet another illustrative example, the graphical indicators can include links that selectable to provide more detailed information about parts. For example, graphical indicator can be selected in a spatial zone to identify parts that have weight differences between the aircraft and the comparison aircraft. The identification of parts can be presented in a table in response to a selection of the spatial zone, a graphical display of the part, a display of a part number, or other information.

Figure 8:
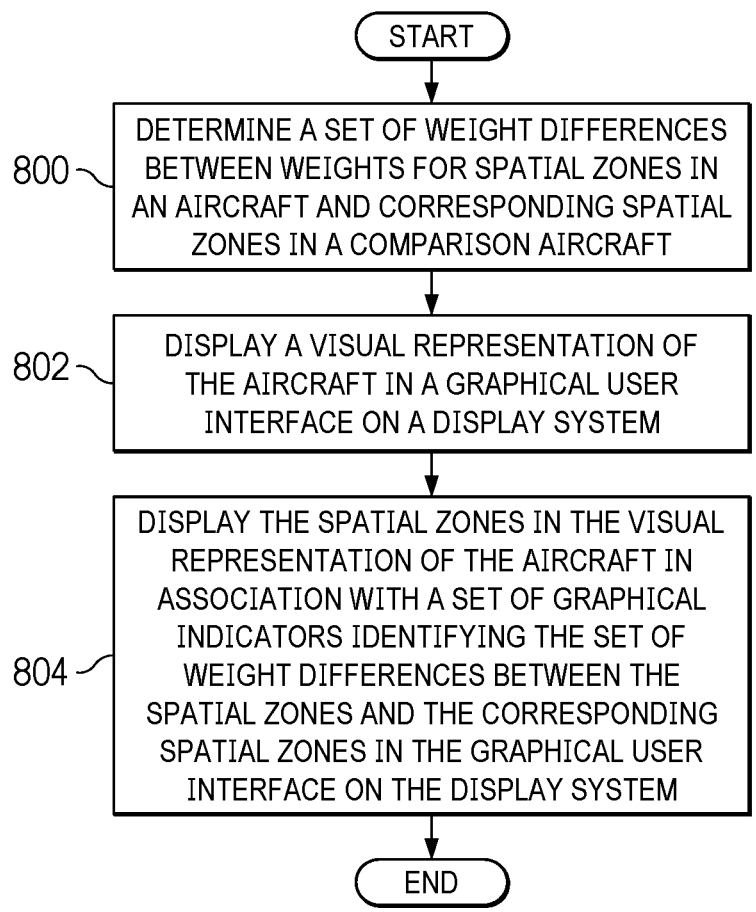
FIG. 8 is an illustration of a flowchart of a process for visualizing aircraft configurations in accordance with an illustrative embodiment.

Turning next to FIG. 8, an illustration of a flowchart of a process for visualizing aircraft configurations is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. For example, the process can be implemented in configuration manager 210 in computer system 208 in FIG. 2.

The process begins by determining a set of weight differences between weights for spatial zones in an aircraft and corresponding spatial zones in a comparison aircraft (operation 800). The process displays a visual representation of the aircraft in a graphical user interface on a display system (operation 802).

The process displays the spatial zones in the visual representation of the aircraft in association with a set of graphical indicators identifying the set of weight differences between the spatial zones and the corresponding spatial zones in the graphical user interface on the display system (operation 804). The process terminates thereafter.

Figure 9:
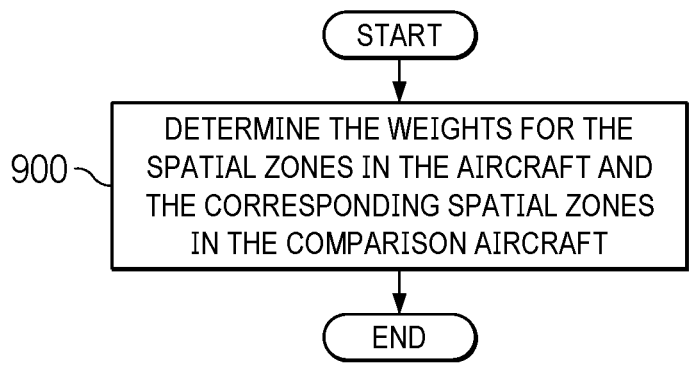
FIG. 9 is an illustration of a flowchart of a process for determining weights for spatial zones in aircraft in accordance with an illustrative embodiment.

With reference to FIG. 9, an illustration of a flowchart of a process for determining weights for spatial zones in aircraft is depicted in accordance with an illustrative embodiment. The operation in FIG. 9 is an example of an additional operation that can be used with the operations in the process in FIG. 8.

The process determines the weights for the spatial zones in the aircraft and the corresponding spatial zones in the comparison aircraft (operation 900). The process terminates thereafter.

Figure 10:
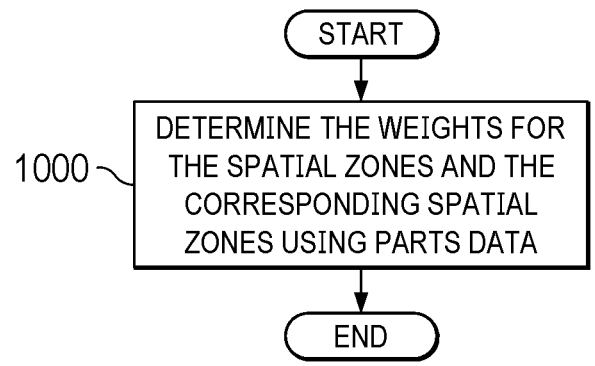
FIG. 10 is an illustration of a flowchart of a process for determining weights for spatial zones in aircraft in accordance with an illustrative embodiment.

Turning to FIG. 10, an illustration of a flowchart of a process for determining weights for spatial zones in aircraft is depicted in accordance with an illustrative embodiment. The process in FIG. 10 is an example of an implementation of operation 900 in FIG. 9.

The process determines the weights for the spatial zones and the corresponding spatial zones using parts data (operation 1000). The process terminates thereafter.

Figure 11:
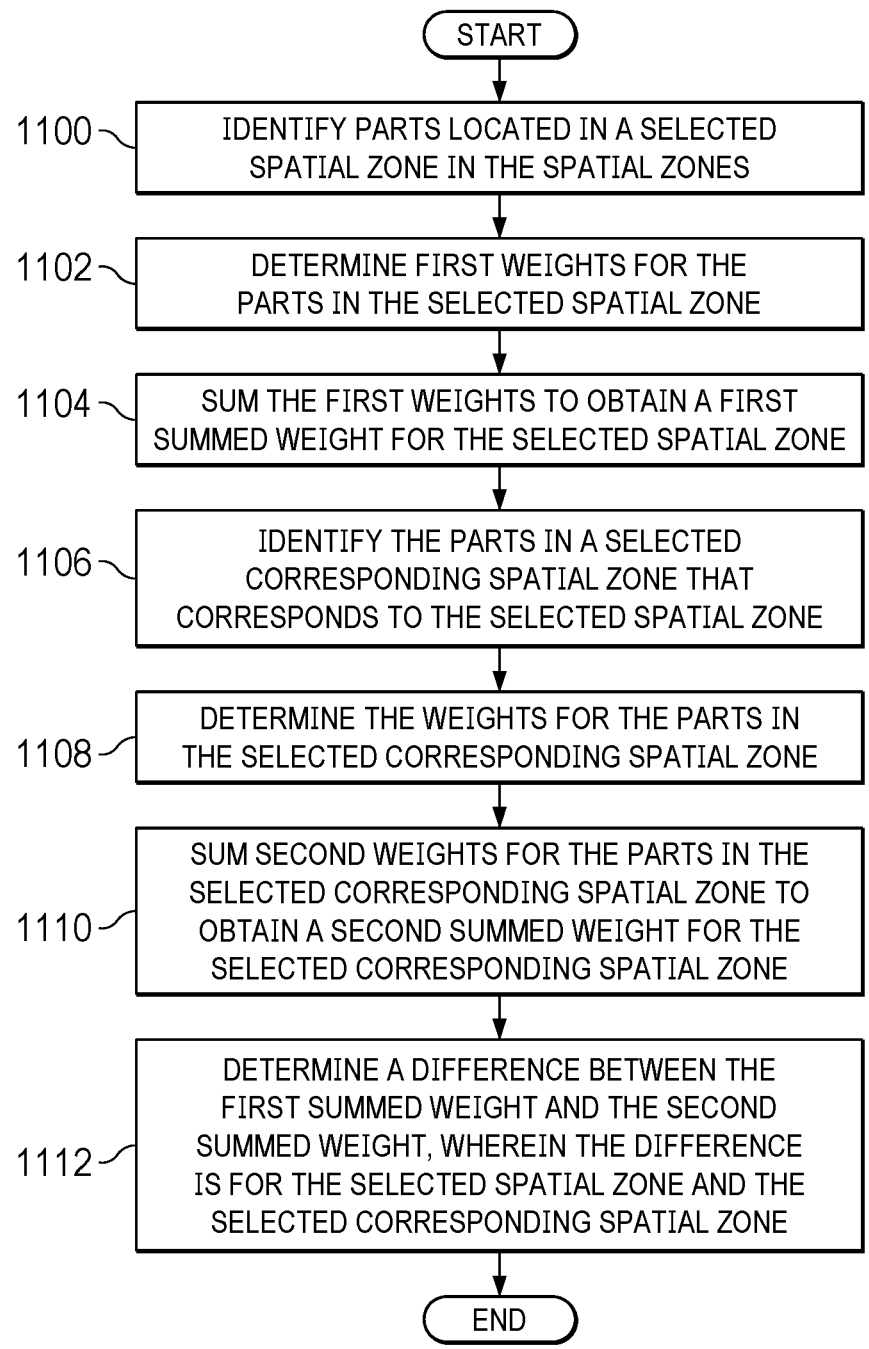
FIG. 11 is an illustration of a flowchart of a process for determining weight difference between for selected spatial zone and a corresponding spatial zone in an aircraft in accordance with an illustrative embodiment.

Turning next to FIG. 11, an illustration of a flowchart of a process for determining weight difference between for selected spatial zone and a corresponding spatial zone in an aircraft is depicted in accordance with an illustrative embodiment. The process in FIG. 11 is an example of an implementation of operation 800 in FIG. 8.

The process begins by identifying parts located in a selected spatial zone in the spatial zones (operation 1100). The process determines first weights for the parts in the selected spatial zone (operation 1102). The process sums the first weights to obtain a first summed weight for the selected spatial zone (operation 1104).

The process identifies the parts in a selected corresponding spatial zone that corresponds to the selected spatial zone (operation 1106). The process determines the weights for the parts in the selected corresponding spatial zone (operation 1108). The process sums second weights for the parts in the selected corresponding spatial zone to obtain a second summed weight for the selected corresponding spatial zone (operation 1110).

The process determines a difference between the first summed weight and the second summed weight, wherein the difference is for the selected spatial zone and the selected corresponding spatial zone (operation 1112). The process terminates thereafter.

Figure 12:
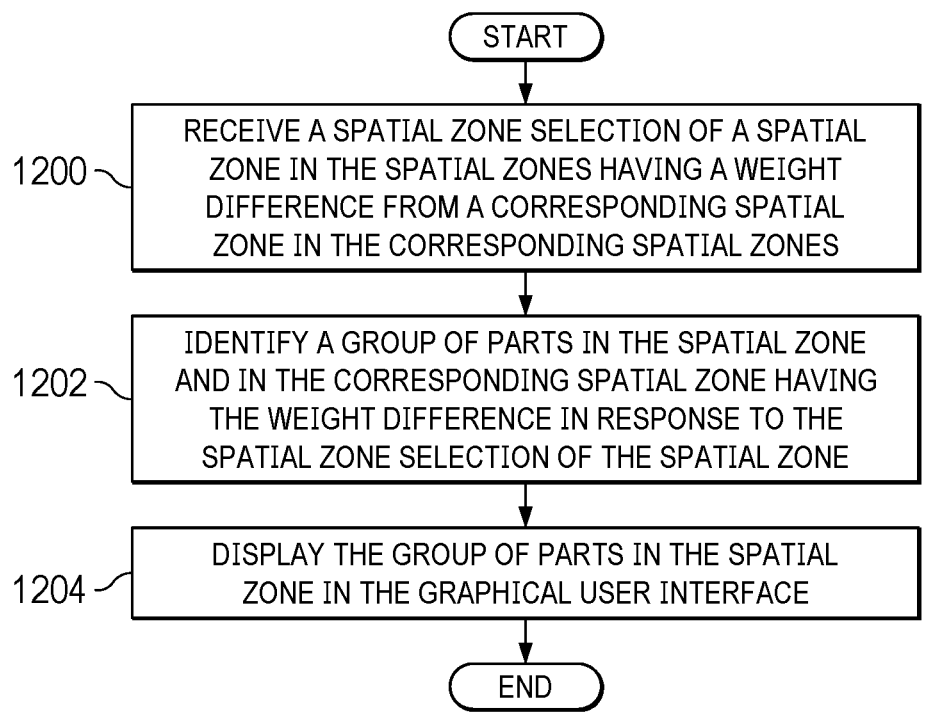
FIG. 12 is an illustration of a flowchart of a process for displaying a group of parts in a spatial zone and a corresponding spatial zone for aircraft in accordance with an illustrative embodiment.

With reference to FIG. 12, an illustration of a flowchart of a process for displaying a group of parts in a spatial zone and a corresponding spatial zone for aircraft is depicted in accordance with an illustrative embodiment. The operations in FIG. 12 are examples of additional operations that can be used with the operations in the process in FIG. 8.

The process begins by receiving a spatial zone selection of a spatial zone in the spatial zones having a weight difference from a corresponding spatial zone in the corresponding spatial zones (operation 1200). The process identifies a group of parts in the spatial zone and in the corresponding spatial zone having the weight difference in response to the spatial zone selection of the spatial zone (operation 1202). The process displays the group of parts in the spatial zone in the graphical user interface (operation 1204). The process terminates thereafter.

Figure 13:
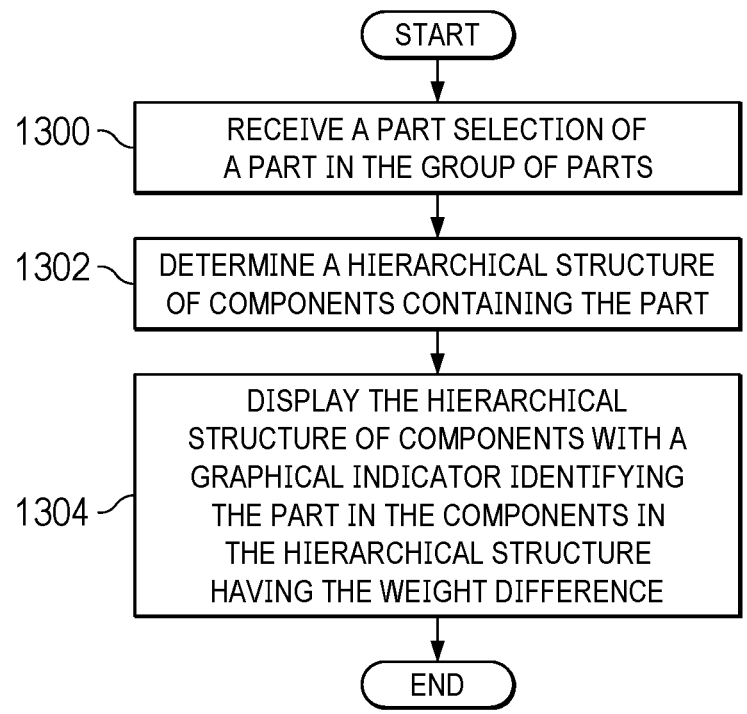
FIG. 13 is an illustration of a flowchart of a process for displaying a hierarchical structure of components containing a part in accordance with an illustrative embodiment.

Turning to FIG. 13, an illustration of a flowchart of a process for displaying a hierarchical structure of components containing a part is depicted in accordance with an illustrative embodiment. The operations in FIG. 13 are examples of additional operations that can be used with the operations in the process in FIG. 12.

The process begins by receiving a part selection of a part in the group of parts (operation 1300). The process determines a hierarchical structure of components containing the part (operation 1302).

The process displays the hierarchical structure of components with a graphical indicator identifying the part in the components in the hierarchical structure having the weight difference (operation 1304). The process terminates thereafter.

Figure 14:
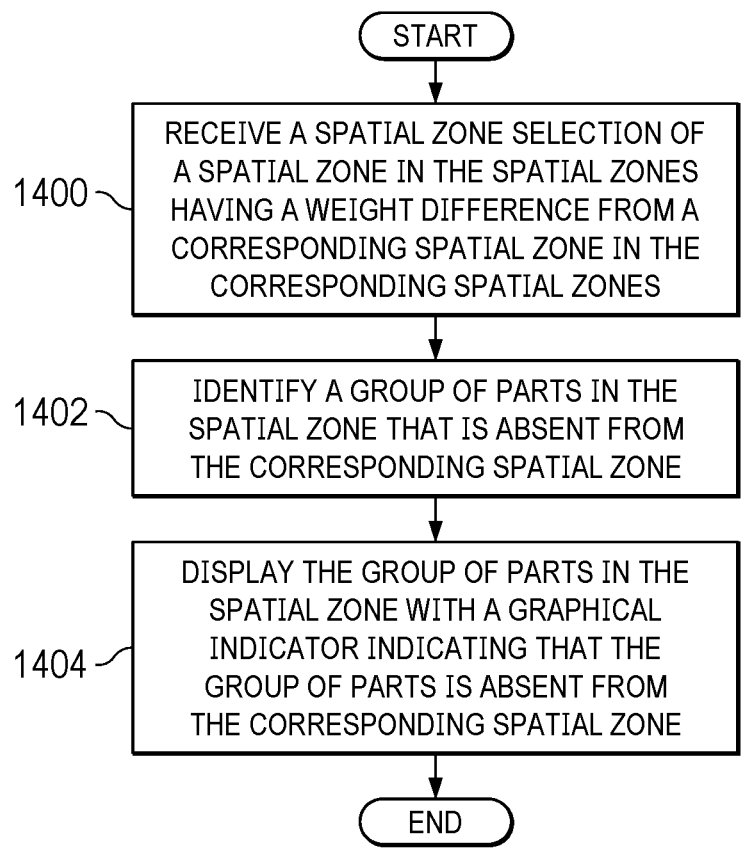
FIG. 14 is an illustration of a flowchart of a process for displaying a group of parts in a spatial zone that is absent from a corresponding spatial zone in accordance with an illustrative embodiment.

Turning next to FIG. 14, an illustration of a flowchart of a process for displaying a group of parts in a spatial zone that is absent from a corresponding spatial zone is depicted in accordance with an illustrative embodiment. The operations in FIG. 14 are examples of additional operations that can be used with the operations in the process in FIG. 8.

The process begins by receiving a spatial zone selection of a spatial zone in the spatial zones having a weight difference from a corresponding spatial zone in the corresponding spatial zones (operation 1400). The process identifies a group of parts in the spatial zone that is absent from the corresponding spatial zone (operation 1402).

The process displays the group of parts in the spatial zone with a graphical indicator indicating that the group of parts is absent from the corresponding spatial zone (operation 1404). The process terminates thereafter.

Figure 15:
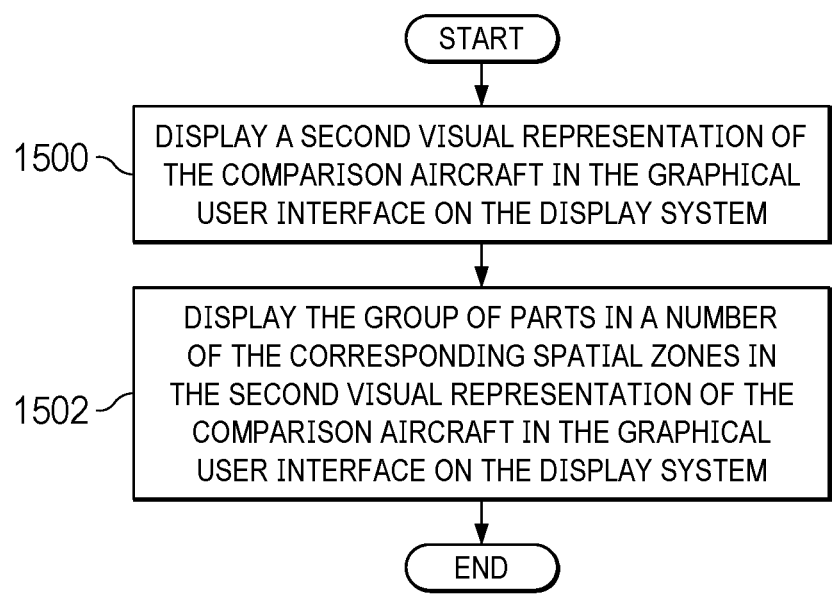
FIG. 15 is an illustration of a flowchart of a process for displaying parts in corresponding spatial zones in a second visual representation in accordance with an illustrative embodiment.

With reference to FIG. 15, an illustration of a flowchart of a process for displaying parts in corresponding spatial zones in a second visual representation is depicted in accordance with an illustrative embodiment. The operations in FIG. 15 are examples of additional operations that can be used with the operations in the process in FIG. 14.

The process begins by displaying a second visual representation of the comparison aircraft in the graphical user interface on the display system (operation 1500). The process displays the group of parts in a number of the corresponding spatial zones in the second visual representation of the comparison aircraft in the graphical user interface on the display system (operation 1502). The process terminates thereafter.

Figure 16:
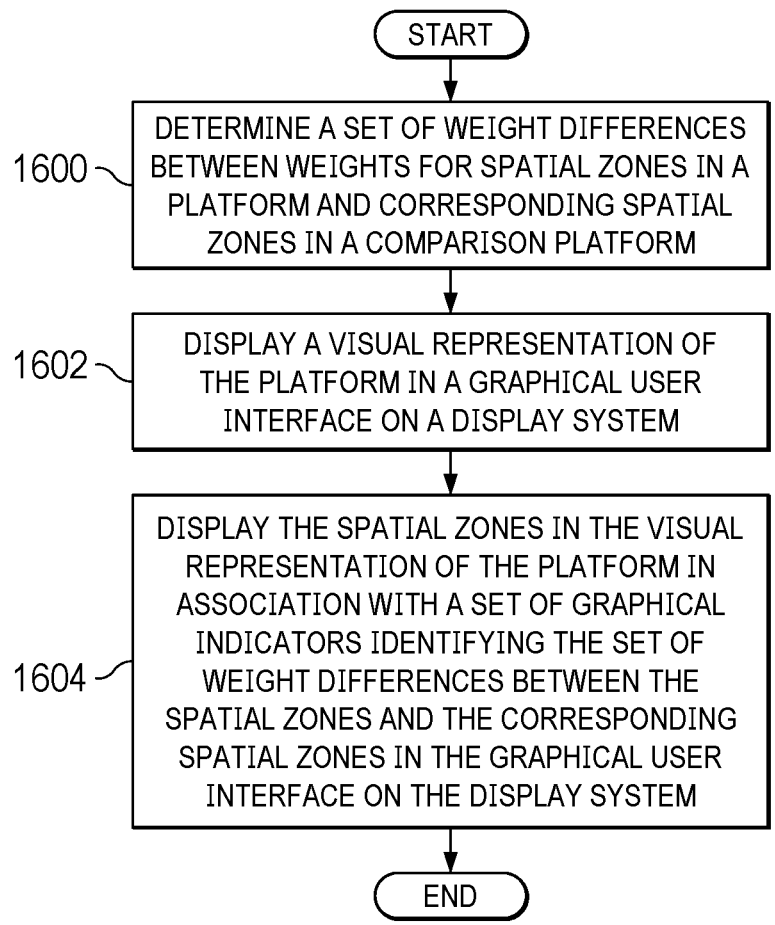
FIG. 16 is an illustration of a flowchart of a process for visualizing platform configurations in accordance with an illustrative embodiment.

Turning to FIG. 16, an illustration of a flowchart of a process for visualizing platform configurations is depicted in accordance with an illustrative embodiment. The process in FIG. 16 can be implemented in hardware, software, or both. When implemented in software, the process can take the form of program instructions that is run by one of more processor units located in one or more hardware devices in one or more computer systems. For example, the process can be implemented in configuration manager 210 in computer system 208 in FIG. 2.

The process begins by determining a set of weight differences between weights for spatial zones in a platform and corresponding spatial zones in a comparison platform (operation 1600). The process displays a visual representation of the platform in a graphical user interface on a display system (operation 1602). The process displays the spatial zones in the visual representation of the platform in association with a set of graphical indicators identifying the set of weight differences between the spatial zones and the corresponding spatial zones in the graphical user interface on the display system (operation 1604). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
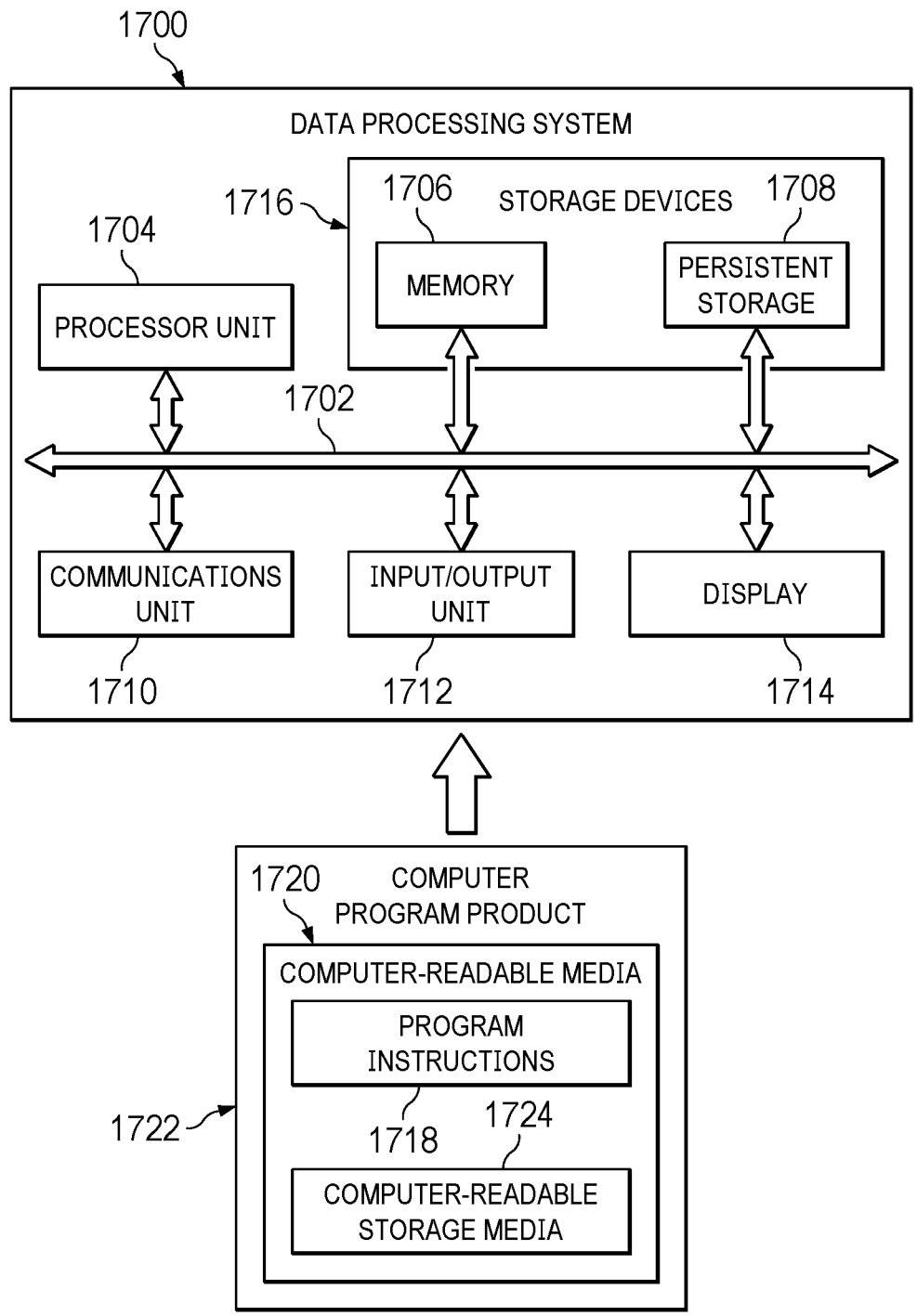
FIG. 17 is an illustration of a block diagram of a data processing system in accordance with an illustrative embodiment.

Turning now to FIG. 17, a block diagram of a data processing system is depicted in accordance with an illustrative embodiment. Data processing system 1700 can be used to implement server computer 104, server computer 106, client devices 110, in FIG. 1. Data processing system 1700 can also be used to implement computer system 208 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer-readable program instructions that can be read and executed by a processor in processor unit 1704. The program instructions in the different embodiments can be embodied on different physical or computer-readable storage media, such as memory 1706 or persistent storage 1708.

Program instructions 1718 is located in a functional form on computer-readable media 1720 that is selectively removable and can be loaded onto or transferred to data processing system 1700 for execution by processor unit 1704. Program instructions 1718 and computer-readable media 1720 form computer program product 1722 in these illustrative examples. In the illustrative example, computer-readable media 1720 is computer-readable storage media 1724.

Computer-readable storage media 1724 is a physical or tangible storage device used to store program instructions 1718 rather than a medium that propagates or transmits program instructions 1718. Computer-readable storage media 1724 can be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1724, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1718 can be transferred to data processing system 1700 using a computer-readable signal media. The computer-readable signal media are signals and can be, for example, a propagated data signal containing program instructions 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1720" can be singular or plural. For example, program instructions 1718 can be located in computer-readable media 1720 in the form of a single storage device or system. In another example, program instructions 1718 can be located in computer-readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer-readable media 1720 in a server computer while another portion of program instructions 1718 can be located in computer-readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

Figure 18:
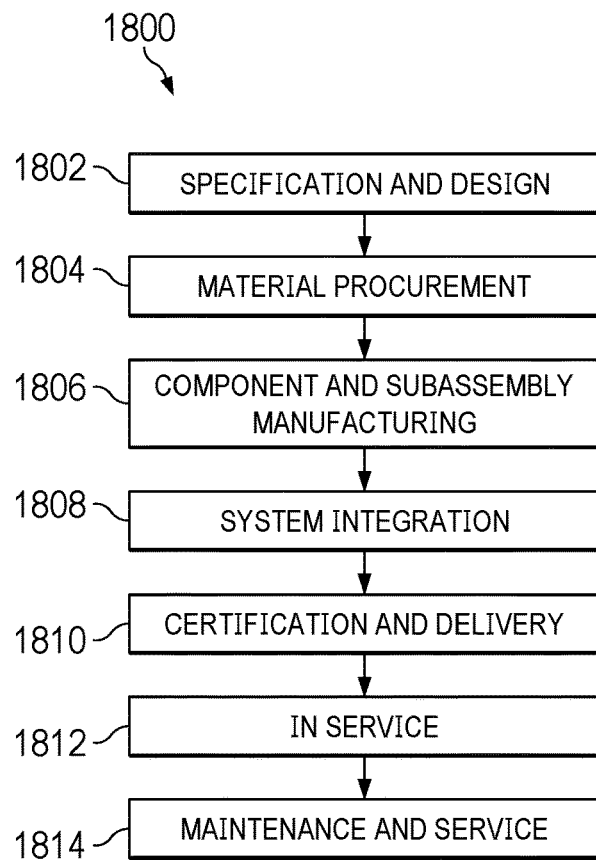
FIG. 18 is an illustration of an aircraft manufacturing and service method in accordance with an illustrative embodiment.
Figure 19:
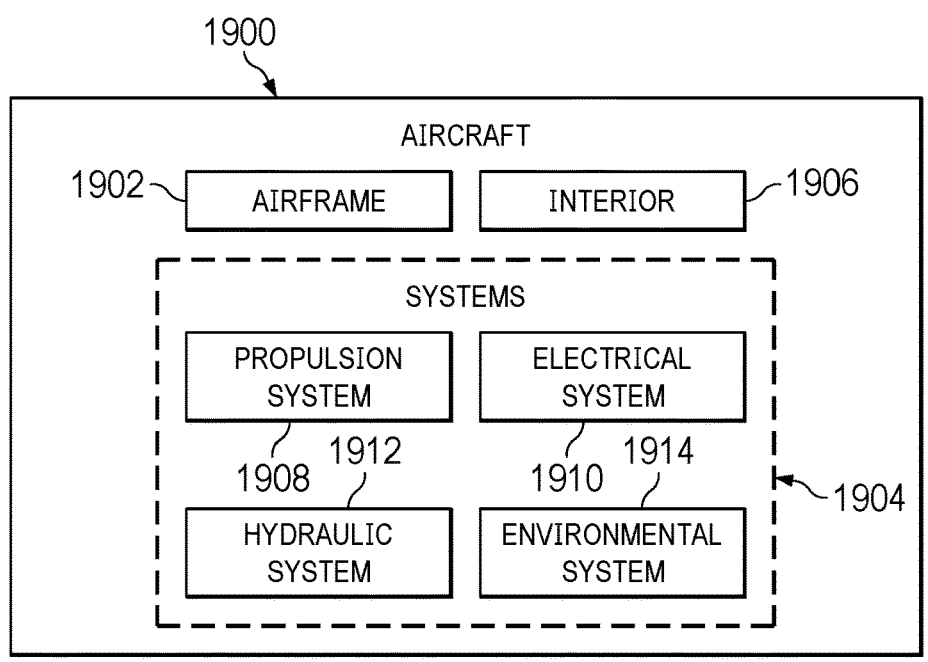
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 can go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 can be fabricated or manufactured in a manner similar to components or subassemblies produced while aircraft 1900 is in service 1812 in FIG. 18. As yet another example, one or more apparatus embodiments, method embodiments, or a combination thereof can be utilized during production stages, such as component and subassembly manufacturing 1806 and system integration 1808 in FIG. 18. One or more apparatus embodiments, method embodiments, or a combination thereof may be utilized while aircraft 1900 is in service 1812, during maintenance and service 1814 in FIG. 18, or both. The use of a number of the different illustrative embodiments may substantially expedite the assembly of aircraft 1900, reduce the cost of aircraft 1900, or both expedite the assembly of aircraft 1900 and reduce the cost of aircraft 1900.

For example, configuration manager 134 in FIG. 1 and configuration manager 210 in FIG. 2 can be used during specification and design 1802 to compare designs of aircraft with each other. For example, a comparison can be made between the current design and a new design that is being developed. As another example, these configuration managers can be used during system integration 1808 and certification and delivery 1810 to compare the state of aircraft during manufacturing and prior to delivery.

In another illustrative example, configuration manager 134 in FIG. 1 and configuration manager 210 in FIG. 2 can be used during maintenance and service 1814 for planning and executing modification, reconfiguration, refurbishment, and other maintenance or service. Configuration manager 210 in FIG. 2 can also be used to compare aircraft to plan configuration changes as well as perform and compare reconfigured aircraft. As another example, when maintenance and service 1814 involves replacing or upgrading parts, identifying weight differences in spatial zones in aircraft can be used to determine whether the replacement or upgrade of parts were performed as desired according to the specification for maintenance plan.

Some features of the illustrative examples are described in the following clauses. These clauses are examples of features and are not intended to limit other illustrative examples.

Clause 1

A method for visualizing aircraft configurations, the method comprising:

determining, by a computer system, a set of weight differences between weights for spatial zones in an aircraft and corresponding spatial zones in a comparison aircraft;

displaying, by the computer system, a visual representation of the aircraft in a graphical user interface on a display system; and displaying, by the computer system, the spatial zones in the visual representation of the aircraft in association with a set of graphical indicators identifying the set of weight differences between the spatial zones and the corresponding spatial zones in the graphical user interface on the display system.

Clause 2

The method according to clause 1 further comprising:

determining, by the computer system, the weights for the spatial zones in the aircraft and the corresponding spatial zones in the comparison aircraft.

Clause 3

The method according to clause 2, wherein determining, by the computer system, the weights for the spatial zones and the corresponding spatial zones comprises:

determining, by the computer system, the weights for the spatial zones and the corresponding spatial zones using parts data.

Clause 4

The method according to clause 3, wherein the parts data comprises at least one of a bill of materials identifying parts used in the aircraft and the comparison aircraft, spatial part information identifying part locations for the parts, weight data for the parts, a parts list, a part location table, or a weight list for the parts.

Clause 5

The method according to one of clauses 1, 2, 3, or 4, wherein determining, by the computer system, the set of weight differences between the weights for the spatial zones in the aircraft and the corresponding spatial zones in the comparison aircraft comprises:

identifying, by the computer system, parts located in a selected spatial zone in the spatial zones;

determining, by the computer system, first weights for the parts in the selected spatial zone;

summing, by the computer system, the first weights to obtain a first summed weight for the selected spatial zone;

identifying, by the computer system, the parts in a selected corresponding spatial zone that corresponds to the selected spatial zone;

determining, by the computer system, the weights for the parts in the selected corresponding spatial zone;

summing, by the computer system, second weights for the parts in the selected corresponding spatial zone to obtain a second summed weight for the selected corresponding spatial zone; and determining, by the computer system, a difference between the first summed weight and the second summed weight, wherein the difference is for the selected spatial zone and the selected corresponding spatial zone.

Clause 6

The method according to one of clauses 1, 2, 3, 4, or 5 further comprising:

receiving, by the computer system, a spatial zone selection of a spatial zone in the spatial zones having a weight difference from a corresponding spatial zone in the corresponding spatial zones;

identifying, by the computer system, a group of parts in the spatial zone and in the corresponding spatial zone having the weight difference in response to the spatial zone selection of the spatial zone; and displaying, by the computer system, the group of parts in the spatial zone in the graphical user interface.

Clause 7

The method according to clause 6 further comprising:

receiving, by the computer system, a part selection of a part in the group of parts;

determining, by the computer system, a hierarchical structure of components containing the part; and displaying, by the computer system, the hierarchical structure of the components with a graphical indicator identifying the part in the components in the hierarchical structure having the weight difference.

Clause 8

The method according to one of clauses 1, 2, 3, 4, 5, 6, or 7 further comprising:

receiving, by the computer system, a spatial zone selection of a spatial zone in the spatial zones having a weight difference from a corresponding spatial zone in the corresponding spatial zones;

identifying, by the computer system, a group of parts in the spatial zone that is absent from the corresponding spatial zone; and displaying, by the computer system, the group of parts in the spatial zone with a graphical indicator indicating that the group of parts is absent from the corresponding spatial zone.

Clause 9

The method according to clause 8, wherein the visual representation of the aircraft is a first visual representation and further comprising:

displaying, by the computer system, a second visual representation of the comparison aircraft in the graphical user interface on the display system; and displaying, by the computer system, the group of parts in a number of the corresponding spatial zones in the second visual representation of the comparison aircraft in the graphical user interface on the display system.

Clause 10

The method according to one of clauses 1, 2, 3, 4, 5, 6, 7, 8, or 9, wherein the weights are selected from one of actual part weights and estimated part weights.

Clause 11

The method according to one of clauses 5, 6, 7, 8, 9, or 10, wherein the parts are one of a module, an assembly, and components.

Clause 12

The method according to one of clauses 1, 2, 3, 4, 5, 6, 7, 8, 9, 10, or 11, wherein the aircraft and the comparison aircraft are both of a same model or of a same model variant.

Clause 13

An configuration visualization system comprising:

a computer system executes program instructions to:

determine a set of weight differences between weights for spatial zones in an aircraft and corresponding spatial zones in a comparison aircraft;

display a visual representation of the aircraft in a graphical user interface on a display system; and display the spatial zones in the visual representation of the aircraft in association with a set of graphical indicators identifying the set of weight differences between the spatial zones and the corresponding spatial zones in the graphical user interface on the display system.

Clause 14

The configuration visualization system according to clause 13, wherein the computer system executes the program instructions to:

determine the weights for the spatial zones in the aircraft and the corresponding spatial zones in the comparison aircraft.

Clause 15

The configuration visualization system according to clause 14, wherein in determining the weights for the spatial zones and the corresponding spatial zones, the computer system executes the program instructions to:

determining the weights for the spatial zones and the corresponding spatial zones using parts data.

Clause 16

The configuration visualization system according to clause 15, wherein the parts data comprises at least one of a bill of materials identifying parts used in the aircraft and the comparison aircraft, spatial part information identifying part locations for the parts, weight data for the parts, a parts list, a part location table, or a weight list for the parts.

Clause 17

The configuration visualization system according to one of clauses 13, 14, 15, or 16, wherein in determining the set of weight differences between the weights for the spatial zones in the aircraft and the corresponding spatial zones in the comparison aircraft, the computer system executes the program instructions to:

identify parts located in a selected spatial zone in the spatial zones;

determine first weights for the parts in the selected spatial zone;

sum the first weights to obtain a first summed weight for the selected spatial zone;

identify the parts in a selected corresponding spatial zone that corresponds to the selected spatial zone;

determine the weights for the parts in the selected corresponding spatial zone;

sum second weights for the parts in the selected corresponding spatial zone to obtain a second summed weight for the selected corresponding spatial zone; and determine a difference between the first summed weight and the second summed weight, wherein the difference is for the selected spatial zone and the selected corresponding spatial zone.

Clause 18

The configuration visualization system according to one of clauses 13, 14, 15, 16, or 17, wherein the computer system executes the program instructions to:
receive a spatial zone selection of a spatial zone in the spatial zones having a weight difference from a corresponding spatial zone in the corresponding spatial zones;
identify a group of parts in the spatial zone and in the corresponding spatial zone having the weight difference in response to the spatial zone selection of the spatial zone; and
display the group of parts in the spatial zone in the graphical user interface.

Clause 19

The configuration visualization system according to clause 18, wherein the computer system executes the program instructions to:
receive a part selection of a part in the group of parts;
determine a hierarchical structure of components containing the part; and
display the hierarchical structure of the components with a graphical indicator identifying the part in the components in the hierarchical structure having the weight difference.

Clause 20

The configuration visualization system according to one of clauses 13, 14, 15, 16, 17, 18, or 19, wherein the computer system executes the program instructions to:
receive a spatial zone selection of a spatial zone in the spatial zones having a weight difference from a corresponding spatial zone in the corresponding spatial zones;
identify a group of parts in the spatial zone that is absent from the corresponding spatial zone; and
display the group of parts in the spatial zone with a graphical indicator indicating that the group of parts is absent from the corresponding spatial zone.

Clause 21

The configuration visualization system according to clause 20, wherein the visual representation of the aircraft is a first visual representation and wherein the computer system executes the program instructions to:
display a second visual representation of the comparison aircraft in the graphical user interface on the display system; and
display the group of parts in a number of the corresponding spatial zones in the second visual representation of the comparison aircraft in the graphical user interface on the display system.

Clause 22

The configuration visualization system according to one of clauses 13, 14, 15, 16, 17, 18, 19, or 21, wherein the weights are selected from one of actual part weights and estimated part weights.

Clause 23

The configuration visualization system according to one of clauses 17, 18, 19, 20, 21, or 22, wherein the parts are one of a module, an assembly, and components.

Clause 24

The configuration visualization system according to one of clauses 13, 14, 15, 16, 17, 18, 19, 21, 22, or 23, wherein the aircraft and the comparison aircraft are both of a same model or of a same model variant.

Clause 25

A computer program product for visualizing aircraft configurations, the computer program product comprising a computer readable storage medium having program instructions embodied therewith, the program instructions executable by a computer system to cause the computer system to perform a method of:
determining, by the computer system, a set of weight differences between weights for spatial zones in an aircraft and corresponding spatial zones in a comparison aircraft;
displaying, by the computer system, a visual representation of the aircraft in a graphical user interface on a display system; and
displaying, by the computer system, the spatial zones in the visual representation of the aircraft in association with a set of graphical indicators identifying the set of weight differences between the spatial zones and the corresponding spatial zones in the graphical user interface on the display system.

Clause 26

A method for visualizing platform configurations, the method comprising:
determining, by a computer system, a set of weight differences between weights for spatial zones in a platform and corresponding spatial zones in a comparison platform;
displaying, by the computer system, a visual representation of the platform in a graphical user interface on a display system; and
displaying, by the computer system, the spatial zones in the visual representation of the platform in association with a set of graphical indicators identifying the set of weight differences between the spatial zones and the corresponding spatial zones in the graphical user interface on the display system.

Thus, the illustrative embodiments provide a method, apparatus, system, and computer program product for visualizing aircraft configurations. In one illustrative example, a computer system determines a set of weight differences between weights for spatial zones in an aircraft and corresponding spatial zones in a comparison aircraft. The computer system displays a visual representation of the aircraft in a graphical user interface on a display system. The computer system displays the spatial zones in the visual representation of the aircraft in association with a set of graphical indicators identifying the set of weight differences between the spatial zones and the corresponding spatial zones in the graphical user interface on the display system.

With these visualizations of configuration differences, human operator can more easily compare individualized airplane configurations as compared to current techniques. In the illustrative examples, the use of weights for spatial zones determined from part weights for parts in the spatial zones enable displaying differences between a spatial zone in an aircraft and the corresponding spatial zone in the comparison aircraft.

A human operator can more easily identify differences between two configurations of an airplane. For example, a human operator may desire to convert an airplane from a passenger airplane to a cargo airplane. With this conversion, a comparison is used to determine what changes are needed to reconfigure the passenger airplane to a cargo airplane. In this example, a cargo airplane having a desired configuration can be an aircraft that is compared to the passenger airplane which is the comparison aircraft in this example. The cargo airplane can be compared to a number of different passenger airplanes to determine which passenger airplanes may be most suitable for conversion. Based on the visualization of weight differences in spatial zones, determining what changes are needed and the cost of those changes can be more easily made using a configuration manager in the illustrative examples.

The description of the different illustrative embodiments has been presented for purposes of illustration and description and is not intended to be exhaustive or limited to the embodiments in the form disclosed. For example, although platform 204 in FIG. 2 has been described as an aircraft, the illustrative examples can be applied to comparing configurations of other types of platforms. A platform for comparison can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, the determination of weights for spatial zones in aircraft can be made to determine a center of gravity for the aircraft. With the weights for the spatial zones, the placement of cargo within the aircraft can be selected to balance the aircraft with respect to the center of gravity and can provide a more neutral trim. With this implementation of the configuration manager, weight balancing of cargo in the aircraft can improve the performance of the aircraft for each flight of the aircraft. In other words, as different types of cargo are to be carried by the aircraft, the placement of the cargo to obtain a desired balance with respect to the center of gravity can be tailored towards the cargo that is to be transported. Additionally, by balancing the cargo using the weights in the spatial zones, reduced issues with vibrations or adjusted trim can occur. As result, reduced maintenance from wear on parts and aircraft can occur. Further, less compensation by flight control surfaces can be used when the cargo is loaded to balance the aircraft for flight. With reduced trim adjustments and control adjustments, quicker responses can be obtained from the aircraft. This type of balancing can also improve safety through undesired environmental conditions such as thunderstorms or turbulence.

The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for visualizing aircraft configurations, the method comprising:
    determining, by a computer system, a set of weight differences between weights for spatial zones in an aircraft and corresponding spatial zones in a comparison aircraft;
    displaying, by the computer system, a visual representation of the aircraft in a graphical user interface on a display system; and
    displaying, by the computer system, the spatial zones in the visual representation of the aircraft in association with a set of graphical indicators identifying the set of weight differences between the spatial zones and the corresponding spatial zones in the graphical user interface on the display system.

2. The method of claim 1 further comprising:
    determining, by the computer system, the weights for the spatial zones in the aircraft and the corresponding spatial zones in the comparison aircraft.

3. The method of claim 2, wherein determining, by the computer system, the weights for the spatial zones and the corresponding spatial zones comprises:
    determining, by the computer system, the weights for the spatial zones and the corresponding spatial zones using parts data.

4. The method of claim 3, wherein the parts data comprises at least one of a bill of materials identifying parts used in the aircraft and the comparison aircraft, spatial part information identifying part locations for the parts, weight data for the parts, a parts list, a part location table, or a weight list for the parts.

5. The method of claim 1, determining, by the computer system, the set of weight differences between the weights for the spatial zones in the aircraft and the corresponding spatial zones in the comparison aircraft comprises:
    identifying, by the computer system, parts located in a selected spatial zone in the spatial zones;
    determining, by the computer system, first weights for the parts in the selected spatial zone;
    summing, by the computer system, the first weights to obtain a first summed weight for the selected spatial zone;
    identifying, by the computer system, the parts in a selected corresponding spatial zone that corresponds to the selected spatial zone;
    determining, by the computer system, the weights for the parts in the selected corresponding spatial zone;
    summing, by the computer system, second weights for the parts in the selected corresponding spatial zone to obtain a second summed weight for the selected corresponding spatial zone; and
    determining, by the computer system, a difference between the first summed weight and the second summed weight, wherein the difference is for the selected spatial zone and the selected corresponding spatial zone.

6. The method of claim 1 further comprising:
    receiving, by the computer system, a spatial zone selection of a spatial zone in the spatial zones having a weight difference from a corresponding spatial zone in the corresponding spatial zones;
    identifying, by the computer system, a group of parts in the spatial zone and in the corresponding spatial zone having the weight difference in response to the spatial zone selection of the spatial zone; and displaying, by the computer system, the group of parts in the spatial zone in the graphical user interface.

7. The method of claim 6 further comprising:

receiving, by the computer system, a part selection of a part in the group of parts;

determining, by the computer system, a hierarchical structure of components containing the part; and displaying, by the computer system, the hierarchical structure of the components with a graphical indicator identifying the part in the components in the hierarchical structure having the weight difference.

8. The method of claim 1 further comprising:

receiving, by the computer system, a spatial zone selection of a spatial zone in the spatial zones having a weight difference from a corresponding spatial zone in the corresponding spatial zones;

identifying, by the computer system, a group of parts in the spatial zone that is absent from the corresponding spatial zone; and displaying, by the computer system, the group of parts in the spatial zone with a graphical indicator indicating that the group of parts is absent from the corresponding spatial zone.

9. The method of claim 8, wherein the visual representation of the aircraft is a first visual representation and further comprising:

displaying, by the computer system, a second visual representation of the comparison aircraft in the graphical user interface on the display system; and displaying, by the computer system, the group of parts in a number of the corresponding spatial zones in the second visual representation of the comparison aircraft in the graphical user interface on the display system.

10. The method of claim 1, wherein the weights are selected from one of actual part weights and estimated part weights.

11. The method of claim 5, wherein the parts are one of a module, an assembly, and components.

12. The method of claim 1, wherein the aircraft and the comparison aircraft are both of a same model or of a same model variant.

13. A configuration visualization system comprising:

a computer system comprising processor units and a display system, wherein the computer system executes program instructions to:

determine a set of weight differences between weights for spatial zones in an aircraft and corresponding spatial zones in a comparison aircraft;

display a visual representation of the aircraft in a graphical user interface on a display system; and display the spatial zones in the visual representation of the aircraft in association with a set of graphical indicators identifying the set of weight differences between the spatial zones and the corresponding spatial zones in the graphical user interface on the display system.

14. The configuration visualization system of claim 13, wherein the computer system executes the program instructions to:

determine the weights for the spatial zones in the aircraft and the corresponding spatial zones in the comparison aircraft.

15. The configuration visualization system of claim 14, wherein in determining the weights for the spatial zones and the corresponding spatial zones, the computer system executes the program instructions to:

determining the weights for the spatial zones and the corresponding spatial zones using parts data.

16. The configuration visualization system of claim 15, wherein the parts data comprises at least one of a bill of materials identifying parts used in the aircraft and the comparison aircraft, spatial part information identifying part locations for the parts, weight data for the parts, a parts list, a part location table, or a weight list for the parts.

17. The configuration visualization system of claim 14, wherein in determining the set of weight differences between the weights for the spatial zones in the aircraft and the corresponding spatial zones in the comparison aircraft, the computer system executes the program instructions to:

identify parts located in a selected spatial zone in the spatial zones;

determine first weights for the parts in the selected spatial zone;

sum the first weights to obtain a first summed weight for the selected spatial zone;

identify the parts in a selected corresponding spatial zone that corresponds to the selected spatial zone;

determine the weights for the parts in the selected corresponding spatial zone;

sum second weights for the parts in the selected corresponding spatial zone to obtain a second summed weight for the selected corresponding spatial zone; and determine a difference between the first summed weight and the second summed weight, wherein the difference is for the selected spatial zone and the selected corresponding spatial zone.

18. The configuration visualization system of claim 13, wherein the computer system executes the program instructions to:

receive a spatial zone selection of a spatial zone in the spatial zones having a weight difference from a corresponding spatial zone in the corresponding spatial zones;

identify a group of parts in the spatial zone and in the corresponding spatial zone having the weight difference in response to the spatial zone selection of the spatial zone; and display the group of parts in the spatial zone in the graphical user interface.

19. The configuration visualization system of claim 18, wherein the computer system executes the program instructions to:

receive a part selection of a part in the group of parts;

determine a hierarchical structure of components containing the part; and display the hierarchical structure of the components with a graphical indicator identifying the part in components in the hierarchical structure having the weight difference.

20. The configuration visualization system of claim 13, wherein the computer system executes the program instructions to:

receive a spatial zone selection of a spatial zone in the spatial zones having a weight difference from a corresponding spatial zone in the corresponding spatial zones;

identify a group of parts in the spatial zone that is absent from the corresponding spatial zone; and display the group of parts in the spatial zone with a graphical indicator indicating that the group of parts is absent from the corresponding spatial zone.

21. The configuration visualization system of claim 20, wherein the visual representation of the aircraft is a first visual representation and wherein the computer system executes the program instructions to:
   display a second visual representation of the comparison aircraft in the graphical user interface on the display system; and
   display the group of parts in a number of the corresponding spatial zones in the second visual representation of the comparison aircraft in the graphical user interface on the display system.

22. The configuration visualization system of claim 13, wherein the weights are selected from one of actual part weights and estimated part weights.

23. The configuration visualization system of claim 17, wherein the parts are one of a module, an assembly, and components.

24. The configuration visualization system of claim 13, wherein the aircraft and the comparison aircraft are both of a same model or of a same model variant.

25. A computer program product for visualizing aircraft configurations, the computer program product comprising a computer readable storage medium having program instructions embodied therewith, the program instructions executable by a computer system to cause the computer system to perform a method of:
   determining, by the computer system, a set of weight differences between weights for spatial zones in an aircraft and corresponding spatial zones in a comparison aircraft;
   displaying, by the computer system, a visual representation of the aircraft in a graphical user interface on a display system; and
   displaying, by the computer system, the spatial zones in the visual representation of the aircraft in association with a set of graphical indicators identifying the set of weight differences between the spatial zones and the corresponding spatial zones in the graphical user interface on the display system.

26. A method for visualizing platform configurations, the method comprising:
   determining, by a computer system, a set of weight differences between weights for spatial zones in a platform and corresponding spatial zones in a comparison platform;
   displaying, by the computer system, a visual representation of the platform in a graphical user interface on a display system; and
   displaying, by the computer system, the spatial zones in the visual representation of the platform in association with a set of graphical indicators identifying the set of weight differences between the spatial zones and the corresponding spatial zones in the graphical user interface on the display system.

\* \* \* \* \*